(12) United States Patent
Shinohara et al.

(10) Patent No.: US 10,274,049 B2
(45) Date of Patent: Apr. 30, 2019

(54) REDUCTION DEVICE

(71) Applicant: Hitachi Construction Machinery Co., Ltd., Taito-ku, Tokyo (JP)

(72) Inventors: Takeshi Shinohara, Omitama (JP); Takeshi Shibukawa, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 69 days.

(21) Appl. No.: 15/555,329

(22) PCT Filed: Mar. 1, 2016

(86) PCT No.: PCT/JP2016/056273
§ 371 (c)(1),
(2) Date: Sep. 1, 2017

(87) PCT Pub. No.: WO2016/194423
PCT Pub. Date: Dec. 8, 2016

(65) Prior Publication Data
US 2018/0058546 A1    Mar. 1, 2018

(30) Foreign Application Priority Data

Jun. 3, 2015 (JP) .................................. 2015-113149
Jun. 3, 2015 (JP) .................................. 2015-113152

(51) Int. Cl.
*F16H 1/46* (2006.01)
*B60K 17/04* (2006.01)
(Continued)

(52) U.S. Cl.
CPC ............. *F16H 1/46* (2013.01); *B60K 7/0015* (2013.01); *B60K 17/046* (2013.01); *E02F 9/202* (2013.01);
(Continued)

(58) Field of Classification Search
CPC ........ F16H 1/46; F16H 47/04; F16H 57/0482; F16H 57/0486; F16H 57/082;
(Continued)

(56) References Cited

U.S. PATENT DOCUMENTS

2004/0136627 A1    7/2004 Klier
2004/0152552 A1    8/2004 Nagasugi et al.
(Continued)

FOREIGN PATENT DOCUMENTS

JP         6-249297 A    9/1994
JP         9-177931 A    7/1997
(Continued)

OTHER PUBLICATIONS

Extended European Search Report issued in counterpart European Application No. 16802862.9 dated Nov. 19, 2018 (eight (8) pages).
(Continued)

*Primary Examiner* — Jacob S. Scott
*Assistant Examiner* — Murad Jahmani
(74) *Attorney, Agent, or Firm* — Crowell & Moring LLP

(57) ABSTRACT

A reduction device (18) includes a fixed-side housing (19) accommodating a hydraulic motor (12) having an output shaft (16) and a rotating-side housing (21) rotated with respect to the fixed-side housing (19), and a first-stage planetary gear reduction mechanism (24) having a first sun gear (28) and a second-stage planetary gear reduction mechanism (32) having a second sun gear (33) are provided in the rotating-side housing (21). The first-stage planetary gear reduction mechanism (24) has a rotational shaft (25) having one side in an axial direction spline-connected with the output shaft (16), while the first sun gear (28) is provided on the other side in the axial direction of the rotational shaft (25). A small-diameter shaft (27B) is provided on the rotational shaft (25), and first and second half bushes (40, (Continued)

41) are fitted with the small-diameter shaft (27B) from a radial direction. Thereby, the first sun gear (28) and a stepped part (34A) of the second sun gear (33) are slidably brought into contact with flange parts (40B, 41B) of the first and second half bushes (40, 41).

9 Claims, 19 Drawing Sheets

(51) Int. Cl.

| | | |
|---|---|---|
| *F16C 17/10* | (2006.01) | |
| *E02F 9/20* | (2006.01) | |
| *F16H 57/08* | (2006.01) | |
| *F16H 47/04* | (2006.01) | |
| *F16H 57/04* | (2010.01) | |
| *B60K 7/00* | (2006.01) | |
| *E02F 9/02* | (2006.01) | |
| *E02F 3/32* | (2006.01) | |

(52) U.S. Cl.
CPC ............ *F16C 17/10* (2013.01); *F16H 47/04* (2013.01); *F16H 57/0482* (2013.01); *F16H 57/0486* (2013.01); *F16H 57/082* (2013.01); *B60Y 2200/412* (2013.01); *B60Y 2400/73* (2013.01); *E02F 3/32* (2013.01); *E02F 9/02* (2013.01)

(58) Field of Classification Search
CPC ..... B60K 7/0015; B60K 17/046; E02F 9/202; E02F 3/32; E02F 9/02; F16C 17/10; B60Y 2200/412; B60Y 2400/73
See application file for complete search history.

(56) References Cited

U.S. PATENT DOCUMENTS

| | | | |
|---|---|---|---|
| 2008/0116430 A1* | 5/2008 | Elliott | B66D 1/22 |
| | | | 254/355 |
| 2014/0141917 A1* | 5/2014 | Demick | F16H 47/04 |
| | | | 475/83 |

FOREIGN PATENT DOCUMENTS

| | | |
|---|---|---|
| JP | 2000-9017 A | 1/2000 |
| JP | 2001-343053 A | 12/2001 |
| JP | 2004-232556 A | 8/2004 |
| JP | 2009-68506 A | 4/2009 |
| WO | WO 02/29270 A1 | 4/2002 |

OTHER PUBLICATIONS

International Search Report (PCT/ISA/210) issued in PCT Application No. PCT/JP2016/056273 dated May 24, 2016 with English-language translation (three (3) pages).
Japanese-language Written Opinion (PCT/ISA/237) issued in PCT Application No. PCT/JP2016/056273 dated May 24, 2016 (three (3) pages).

* cited by examiner

REDUCTION DEVICE

TECHNICAL FIELD

The present invention relates to a reduction device suitably used for a traveling device of a hydraulic excavator, a hydraulic crane and the like.

BACKGROUND ART

In general, a lower traveling structure of a tracked vehicle such as a hydraulic excavator is constituted by including a track frame having left and right side frames, a traveling device provided on one end side of each side frame, an idler wheel provided the other end side of each side frame, and a crawler belt wound between a drive wheel (sprocket) provided on the traveling device and the idler wheel.

The traveling device of the hydraulic excavator is normally constituted by a hydraulic motor which is a rotating source and a reduction device which reduces and outputs a speed of rotation of the hydraulic motor. The reduction device is constituted by a fixed-side housing accommodating the rotating source having an output shaft on which a female spline part is provided, a rotating-side housing rotatably provided with respect to the fixed-side housing and driven by the rotating source, a first-stage planetary gear reduction mechanism which is accommodated in the rotating-side housing and reduces the speed of the rotation of the rotating source, and a second-stage planetary gear reduction mechanism located in the rotating-side housing and disposed between the rotating source and the first-stage planetary gear reduction mechanism and reducing the speed of the rotation of the first-stage planetary gear reduction mechanism and rotating the rotating-side housing.

The first-stage planetary gear reduction mechanism is constituted by the rotational shaft on which a male spline part connected with the female spline part of the output shaft is provided on one side in an axial direction, a first sun gear provided on the other side in the axial direction of the rotational shaft, a plurality of first planetary gears meshed with the first sun gear and an internal gear provided on an inner peripheral side of the rotating-side housing and revolving while rotating around the first sun gear, and a first carrier rotatably supporting each of the first planetary gears. The second-stage planetary gear reduction mechanism is constituted by a cylindrical second sun gear connected to the first carrier and having a through hole through which the rotational shaft is inserted, a plurality of second planetary gears meshed with the second sun gear and internal gears provided on the inner peripheral side of the rotating-side housing and rotating the rotating-side housing by rotating around the second sun gear, and a second carrier mounted on the fixed-side housing in a non-rotation state and rotatably supporting each of the second planetary gears (see Patent Document 1, Patent Document 2, and Patent Document 3, for example).

PRIOR ART DOCUMENT

Patent Document
Patent Document 1: Japanese Patent Laid-Open No. 2004-232556 A
Patent Document 2: Japanese Patent Laid-Open No. 2000-009017 A
Patent Document 3: Japanese Patent Laid-Open No. 2009-68506 A

SUMMARY OF THE INVENTION

Here, in the prior-art technology according to the aforementioned Patent Document 1, an end surface of the first sun gear provided on the other side in the axial direction of the rotational shaft is brought into contact with a sliding body mounted on an inner surface of a cover which closes the rotating-side housing. Further, one end in the axial direction of the rotational shaft on which the male spline part is provided is brought into contact with the output shaft of the rotating source on which the female spline part is provided. Thereby, the first sun gear and the rotational shaft are constituted to be positioned in the axial direction.

However, in the prior-art technology according to Patent Document 1, a force in the axial direction acting on the rotational shaft by meshing with the first sun gear is received by the output shaft of the rotating source. Thus, the output shaft needs to be rotatably supported by using a bearing which receives a radial load and a thrust load such as a taper roller bearing, and the like for example. Thus, pressurization control for the bearing is needed, whereby a manufacturing cost of the reduction device is increased.

Further, in the prior-art technology according to the Patent Document 1, when rocks or the like collides against the cover of the rotating-side housing during traveling of the hydraulic excavator, a load toward the inner side of the rotating-side housing is added to the cover. In this case, the load added to the cover is transmitted to the output shaft of the rotating source through the first sun gear and the rotational shaft. Thereby, an excessive load acts on the bearing supporting the output shaft, and there is a problem that durability of the bearing lowers.

On the other hand, in the prior-art technologies according to the aforementioned Patent Documents 2 and 3, the end surface of the first sun gear is brought into contact with the sliding body mounted on the inner surface of the cover which closes the rotating-side housing. Moreover, between the first sun gear and the second sun gear, a sliding member slidably in contact with the both is provided. With this arrangement, since the first sun gear and the rotational shaft are positioned in the axial direction by the sliding member brought into contact with the second sun gear, one side in the axial direction of the rotational shaft does not have to be brought into contact with the output shaft of the rotating source. In this case, the force in the axial direction acting on the rotational shaft by meshing with the first sun gear can be received by the sliding member.

Accordingly, in the prior-art technologies according to the aforementioned Patent Documents 2 and 3, a bearing for which pressurization control is not needed such as a roller bearing, a needle bearing or the like can be used as a bearing supporting the output shaft, and a manufacturing cost of the reduction device can be reduced. Moreover, by means of collision of the rocks or the like against the cover of the rotating-side housing, even in the case where the load toward the inner side of the rotating-side housing acts on the cover, the load having acted on the cover is not transmitted to the output shaft of the rotating source through the first sun gear and the rotational shaft, whereby durability of the reduction device can be improved.

However, the sliding member according to the prior-art technologies of Patent Documents 2 and 3 is made of an annular plate body having a center part as a shaft through hole. This sliding member is engaged with the first sun gear provided on the other side in the axial direction of the rotational shaft by insertion of the one side in the axial direction of the rotational shaft on which the male spline part is provided into the shaft through hole. In this state, the other side in the axial direction of the rotational shaft is inserted into the through hole of the second sun gear. As a result, the sliding member is sandwiched between the first sun gear and the second sun gear, and the first sun gear is positioned in the axial direction.

Accordingly, in order to form the sliding member having a large sliding surface on which the first sun gear can stably slide, a dimensional difference between an outer diameter dimension of the first sun gear and an outer diameter dimension of the male spline part needs to be set larger. However, in the case where the number of teeth of the first sun gear is reduced in order to increase a speed reduction ratio of the first planetary gear reduction mechanism, the dimensional difference between the outer diameter dimension of the first sun gear and the outer diameter dimension of the male spline part is decreased, and the sliding surface of the sliding member is decreased. Accordingly, in the case where the sliding member having a large sliding surface is to be arranged between the first sun gear and the second sun gear, there is a problem that design of the first and second planetary gear reduction mechanism is limited by the speed reduction ratio.

The present invention is made in view of the aforementioned prior-art problems and has an object to provide the reduction device so that the first sun gear and the rotational shaft can be positioned in the axial direction by using the sliding member even in the case where the dimensional difference between the outer diameter dimension of the male spline part of the rotational shaft and the outer diameter dimension of the first sun gear is small.

In order to solve the aforementioned problems, the present invention is applied to a fixed-side housing accommodating a rotating source having an output shaft in which a female spline part is provided; a rotating-side housing rotatably provided with respect to the fixed-side housing and driven by the rotating source; a first-stage planetary gear reduction mechanism which is accommodated in the rotating-side housing and reduces a speed of rotation of the rotating source; a second-stage planetary gear reduction mechanism located in the rotating-side housing and disposed between the rotating source and the first-stage planetary gear reduction mechanism and reduces the speed of rotation of the first-stage planetary gear reduction mechanism and rotates the rotating-side housing, wherein the first-stage planetary gear reduction mechanism comprises: a rotational shaft arranged by extending in an axial direction in the rotating-side housing and having one side in the axial direction on which a male spline part which is spline-connected with the female spline part of the output shaft is provided, a first sun gear provided on the other side in the axial direction of the rotational shaft, a plurality of first planetary gears meshed with the first sun gear and an internal gear provided on an inner peripheral side of the rotating-side housing and revolving while rotating around the first sun gear, and a first carrier rotatably supporting each of the first planetary gears; and the second-stage planetary gear reduction mechanism comprises: a second sun gear formed of a cylindrical body having a through hole through which the rotational shaft is inserted and arranged between the female spline part of the output shaft and the first sun gear and connected to the first carrier, a plurality of second planetary gears meshed with the second sun gear and the internal gear provided on the inner peripheral side of the rotating-side housing and rotating around the second sun gear so as to rotate the rotating-side housing, and a second carrier mounted on the fixed-side housing in a non-rotation state and rotatably supporting each of the second planetary gears.

A characteristic of the constitution employed by the present invention is that the rotational shaft of the first-stage planetary gear reduction mechanism is formed as a stepped shaft having the male spline part side as a large-diameter shaft and the first sun gear side as a small-diameter shaft between the male spline part on one side in the axial direction and the first sun gear on the other side in the axial direction; and a sliding member made of two half bodies and fitted with an outer peripheral side of the small-diameter shaft of the rotational shaft is provided between the first sun gear and the second sun gear, and the sliding member is in slidable contact with the first sun gear and the second sun gear.

With this arrangement, by providing the small-diameter shaft on the first sun gear side of the rotational shaft, a dimensional difference between the outer diameter dimension of the small-diameter shaft and the outer diameter dimension of the first sun gear can be ensured large. Accordingly, even in the case where the dimensional difference between the outer diameter dimension of the male spline part provided on the rotational shaft and the outer diameter dimension of the first sun gear is small, by fitting the sliding member made of a plurality of split pieces with the outer peripheral side of the small-diameter shaft, the sliding member having a large sliding surface can be arranged between the first sun gear and the second sun gear. As a result, the first sun gear and the rotational shaft can be reliably positioned in the axial direction by the sliding member, whereby the reduction device can be stably operated for a long time.

Accordingly, by reducing the outer diameter dimension of the first sun gear so as to decrease the number of teeth, the teeth number ratio with the internal gear of the rotating-side housing can be increased. As a result, the speed reduction ratio of the first-stage planetary gear reduction mechanism can be set large, and freedom in designing the first-stage and second-stage planetary gear reduction mechanisms can be improved.

Moreover, the rotational shaft on which the first sun gear is provided is positioned in the axial direction by the sliding member without bringing the end surface of one side in the axial direction into contact with the output shaft of the rotating source. As a result, even in the case where a load in the axial direction acts on the rotational shaft, this load in the axial direction can be received by the sliding member, and the load in the axial direction can be prevented from acting on the output shaft and a bearing supporting the output shaft. As a result, the bearing can stably support the output shaft for a long time, whereby reliability of the reduction device can be improved.

BRIEF DESCRIPTION OF THE DRAWINGS

FIG. 16 is an enlarged sectional view of an essential part of the rotational shaft according to a fourth embodiment of the present invention together with the first sun gear, the first planetary gear, the second sun gear, the sliding member and the like.

MODE FOR CARRYING OUT THE INVENTION

Hereinafter, the embodiments of a reduction device according to the present invention will be explained in detail by referring to the attached drawings by using a case applied to a traveling device of a hydraulic excavator as an example.

Figure 1:
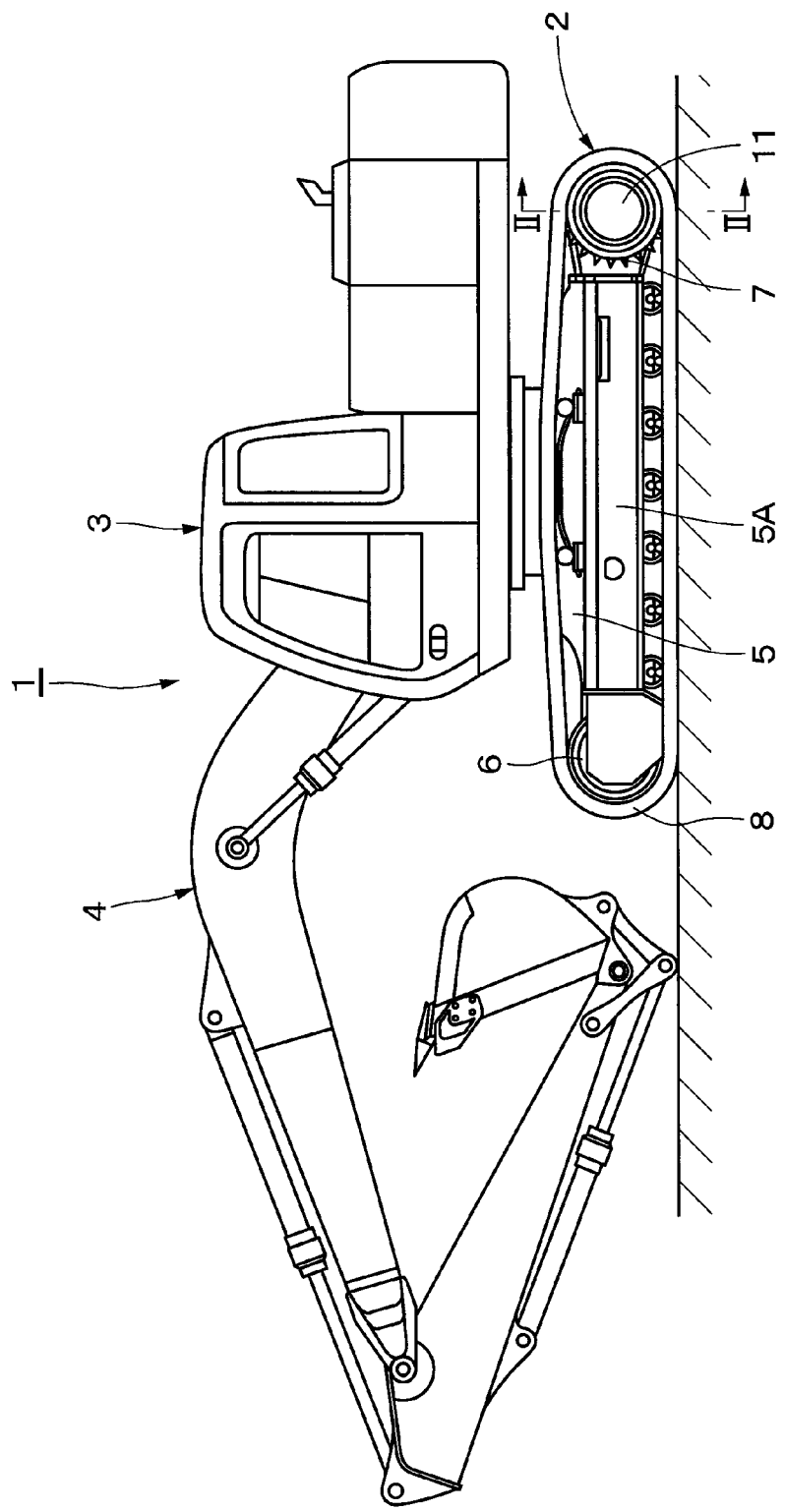
FIG. 1 is a front view showing a hydraulic excavator that includes a reduction device according to a first embodiment of the present invention.

FIG. 1 to FIG. 11 show a first embodiment of the present invention. In FIG. 1, a hydraulic excavator 1 which is a typical example of a construction machine is constituted by including an automotive tracked (crawler-type) lower traveling structure 2 and an upper revolving structure 3 rotatably mounted on the lower traveling structure 2. A working mechanism 4 is tiltably provided on a front part side of the upper revolving structure 3, and an excavating work or the like is performed by using this working mechanism 4.

The lower traveling structure 2 is constituted by including a track frame 5 including left and right side frames 5A (only the left side is shown) extending in a front-rear direction, an idler wheel 6 provided on one side in a longitudinal direction of each side frame 5A, a drive wheel (sprocket) 7 provided on the other side in the longitudinal direction of each side frame 5A, and a crawler belt 8 wound between the idler wheel 6 and the drive wheel 7. The drive wheel 7 is fixed to a reduction device 18 constituting a traveling device 11 which will be described later by a bolt 9. That is, the drive wheel 7 is mounted on each side frame 5A through the traveling device 11, and the drive wheel 7 drives the crawler belt 8 by this traveling device 11.

Subsequently, the traveling device 11 will be explained.

The traveling device 11 is provided between the side frame 5A and the drive wheel 7. This traveling device 11 is constituted by including a hydraulic motor 12 as a rotating source which will be described later and a reduction device 18 to be described later which reduces the speed of rotation of the hydraulic motor 12. The traveling device 11 rotates the drive wheel 7 with a large torque by reducing the speed of the rotation of the hydraulic motor 12 by the reduction device 18. As a result, the crawler belt 8 wound between the drive wheel 7 and the idler wheel 6 is driven.

The swash plate type variable displacement hydraulic motor (hereinafter referred to as the hydraulic motor 12) as a rotating source is accommodated in a fixed-side housing 19 which will be described later. The hydraulic motor 12 is constituted by a cylinder block 13, a plurality of pistons 14, a swash plate 15, an output shaft 16 and the like. The hydraulic motor 12 is to rotate and drive the output shaft 16 by supply of a pressurized oil from a hydraulic pump (not shown).

One end side of the output shaft 16 is rotatably supported by a lid member 19C of the fixed-side housing 19. The other end side of the output shaft 16 is rotatably supported by a bearing 20 provided on a shaft through hole 19F of the fixed-side housing 19. A female spline part 16A is provided on the other end side of the output shaft 16, and a male spline part 26 of a rotational shaft 25 which will be described later is splined-connected with this female spline part 16A.

A brake device 17 is provided on a lid member 19C side of the fixed-side housing 19. The brake device 17 is composed of a negative type brake device and gives a braking force to a cylinder block 13 and the output shaft 16.

Subsequently, the reduction device 18 constituting the traveling device 11 will be explained.

The reduction device 18 reduces the speed of rotation of the hydraulic motor 12 and the rotation of the hydraulic motor 12 is transmitted to the drive wheel 7. The reduction device 18 is constituted by the fixed-side housing 19 which will be described later, a rotating-side housing 21, a first-stage planetary gear reduction mechanism 24, a second-stage planetary gear reduction mechanism 32 and the like.

The fixed-side housing 19 is provided by being fixed to the side frame 5A. The hydraulic motor 12 and the brake device 17 are provided in the fixed-side housing 19. The fixed-side housing 19 is formed having a cylindrical shape with a bottom by a cylinder part 19A and a bottom part 19B, and an opening end side of the cylinder part 19A is closed by the lid member 19C. An annular flange part 19D is integrally formed on an outer peripheral side of the cylinder part 19A, and the flange part 19D is fixed to the side frame 5A by using a bolt or the like. The male spline part 19E is provided on the outer peripheral side of the bottom part 19B, and the male spline part 19E is spline-connected with a female spline part 37B2 of a second carrier 37 which will be described later. At a center part of the bottom part 19B, a shaft through hole 19F through which the output shaft 16 is inserted is provided. Between the shaft through hole 19F and the output shaft 16, the bearing 20 rotatably supporting the output shaft 16 is provided.

The rotating-side housing 21 is rotatably provided with respect to the fixed-side housing 19. The rotating-side housing 21 is rotated and driven by the hydraulic motor 12 accommodated in the fixed-side housing 19. The rotating-side housing 21 is formed having a cylindrical shape with a bottom by a cylinder part 21A and a bottom part 21B, and an opening end side of the cylinder part 21A is closed by a lid part 21C.

An annular flange part 21D is integrally formed on the outer peripheral side of the cylinder part 21A. The drive wheel (sprocket) 7 is fixed by using the bolt 9 to the flange part 21D. An internal gear 21E is provided on the inner peripheral side of the cylinder part 21A, and a first planetary gear 29 and a second planetary gear 36 which will be described later are meshed with the internal gear 21E.

A housing through hole 21F is provided at a center part of the bottom part 21B, and the fixed-side housing 19 is inserted in the housing through hole 21F. The bearing 22 is provided between the housing through hole 21F and the fixed-side housing 19, and the bearing 22 rotatably supports the rotating-side housing 21. A mechanical seal (floating seal) 23 located on the flange part 19D side from the bearing 22 is provided between the housing through hole 21F and the fixed-side housing 19. The mechanical seal 23 seals a lubricant oil in the rotating-side housing 21. Moreover, a sliding body 21G is provided at a center part of an inner side surface of the lid part 21C, and with the sliding body 21G, an end surface 28B on the other side in the axial direction of the rotational shaft 25 which will be described later is slidably brought into contact.

The first-stage planetary gear reduction mechanism 24 is disposed on the lid part 21C side in the rotating-side housing 21. The first-stage planetary gear reduction mechanism 24 reduces the speed of rotation of the hydraulic motor 12 and transmits this rotation to the second-stage planetary gear reduction mechanism 32. The first-stage planetary gear reduction mechanism 24 is constituted by including the rotational shaft 25, a first sun gear 28, the first planetary gear 29, a first carrier 30 and the like.

The rotational shaft 25 is arranged by extending in the axial direction in the rotating-side housing 21. The rotational shaft 25 is constituted by the male spline part 26 provided on the one side (the hydraulic motor 12 side) in the axial direction, a shaft part 27 extending in the axial direction from the male spline part 26, and the first sun gear 28 provided on the other side in the axial direction of the rotational shaft 25. The male spline part 26 is spline-connected with the female spline part 16A of the output shaft 16. The rotational shaft 25 is disposed coaxially with the output shaft 16 of the hydraulic motor 12 and is integrally rotated with the output shaft 16 of the hydraulic motor 12.

The shaft part 27 of the rotational shaft 25 is formed as a stepped shaft having a large-diameter shaft 27A on the male spline part 26 side and a small-diameter shaft 27B on the first sun gear 28 side. An addendum outer diameter dimension of the male spline part 26 and an outer diameter dimension of the large-diameter shaft 27A has a value smaller than a hole diameter of a through hole 34 of a second sun gear 33 which will be described later. Thereby, the male spline part 26 of the rotational shaft 25 and the shaft part 27 are constituted so as to be inserted into the through hole 34 of the second sun gear 33.

The first sun gear 28 is provided on the other side in the axial direction of the rotational shaft 25. The first sun gear 28 is arranged in the first carrier 30 and is meshed with the first planetary gear 29. An axial length dimension of the first sun gear 28 is formed slightly larger than an axial length dimension of the first planetary gear 29, and an addendum outer diameter dimension of the first sun gear 28 has a value larger than an outer diameter dimension of the large-diameter shaft 27A. An end surface 28A on the one side in the axial direction of the first sun gear 28 is slidably brought into contact with a sliding member 39 which will be described later, while the end surface 28B on the other side in the axial direction is slidably brought into contact with the sliding body 21G of the rotating-side housing 21.

The plurality of first planetary gears 29 is meshed with the first sun gear 28 and the internal gear 21E of the rotating-side housing 21. Each of the first planetary gears 29 revolves while rotating around the first sun gear 28 and three pieces of them are provided around the first sun gear 28, for example (only one of them is shown). An outer diameter dimension of an addendum circle of each of the first planetary gears 29 is formed larger than a dimension from a center of the first planetary gear 29 to an addendum outer diameter of the first sun gear 28. Accordingly, an end surface 29A on the one side in the axial direction of each of the first planetary gears 29 is faced with the first sun gear abutting surfaces 40B1 and 41B1 of first and second half bushes 40 and 41 which will be described later on its outer diameter side (tooth side).

The first carrier 30 rotatably supports each of the first planetary gears 29. The first carrier 30 is constituted by the other-side support plate 30A and one-side support plate 30B sandwiching each of the first planetary gears 29 in the axial direction, a plurality of connecting parts 30C connecting the other-side support plate 30A and the one-side support plate 30B, and a plurality of gear support shafts 30D rotatably supporting each of the first planetary gears 29 between the other-side support plate 30A and the one-side support plate 30B.

A rotational shaft through hole 30A1 is drilled at a center part of the other-side support plate 30A located on the other side in the axial direction, and the rotational shaft 25 is inserted into this rotational shaft through hole 30A1. Three other-side support-shaft fitting holes 30A2 (only one of them is shown), for example, are drilled by being located between each of the connecting parts 30C in the other-side support plate 30A, around the rotational shaft through hole 30A1.

On the other hand, a female spline part 30B1 is formed at a center part of the one-side support plate 30B located on the one side in the axial direction, and a carrier connecting part 33C of the second sun gear 33 is spline-connected with this female spline part 30B1. A plurality of (three, for example) one-side support shaft fitting holes 30B2 is drilled around the female spline part 30B1 in the one-side support plate 30B, at positions corresponding to each of the other-side support-shaft fitting holes 30A2 of the other-side support plate 30A.

Each of the gear support shafts 30D has the other side in the axial direction fitted into the other-side support-shaft fitting hole 30A2, and the one side in the axial direction is fitted in the one-side support-shaft fitting hole 30B2. Accordingly, each of the gear support shafts 30D is supported on both sides by the other-side support plate 30A and the one-side support plate 30B and rotatably supports each of the first planetary gears 29 through a bearing 31.

The first carrier 30 rotatably supports each of the first planetary gears 29 by each of the gear support shafts 30D, and each of the first planetary gears 29 is rotated by revolving around the first sun gear 28, thus causing this rotation to be transmitted to the second-stage planetary gear reduction mechanism 32.

The second-stage planetary gear reduction mechanism 32 is located in the rotating-side housing 21 and is disposed between the hydraulic motor 12 and the first-stage planetary gear reduction mechanism 24. The second-stage planetary gear reduction mechanism 32 is to reduce the speed of the rotation of the first-stage planetary gear reduction mechanism 24 and to rotate the rotating-side housing 21. The second-stage planetary gear reduction mechanism 32 is constituted by the second sun gear 33, the second planetary gear 36, the second carrier 37 and the like.

The second sun gear 33 is arranged between the female spline part 16A of the output shaft 16 and the first sun gear 28. The second sun gear 33 is formed of a cylindrical body having the through hole 34 into which the rotational shaft 25 is inserted. An end surface 33A on the other side in the axial direction of the second sun gear 33 is arranged in the first carrier 30 and is faced with the end surface 29A of each of the first planetary gears 29 (see FIG. 3).

Figure 3:
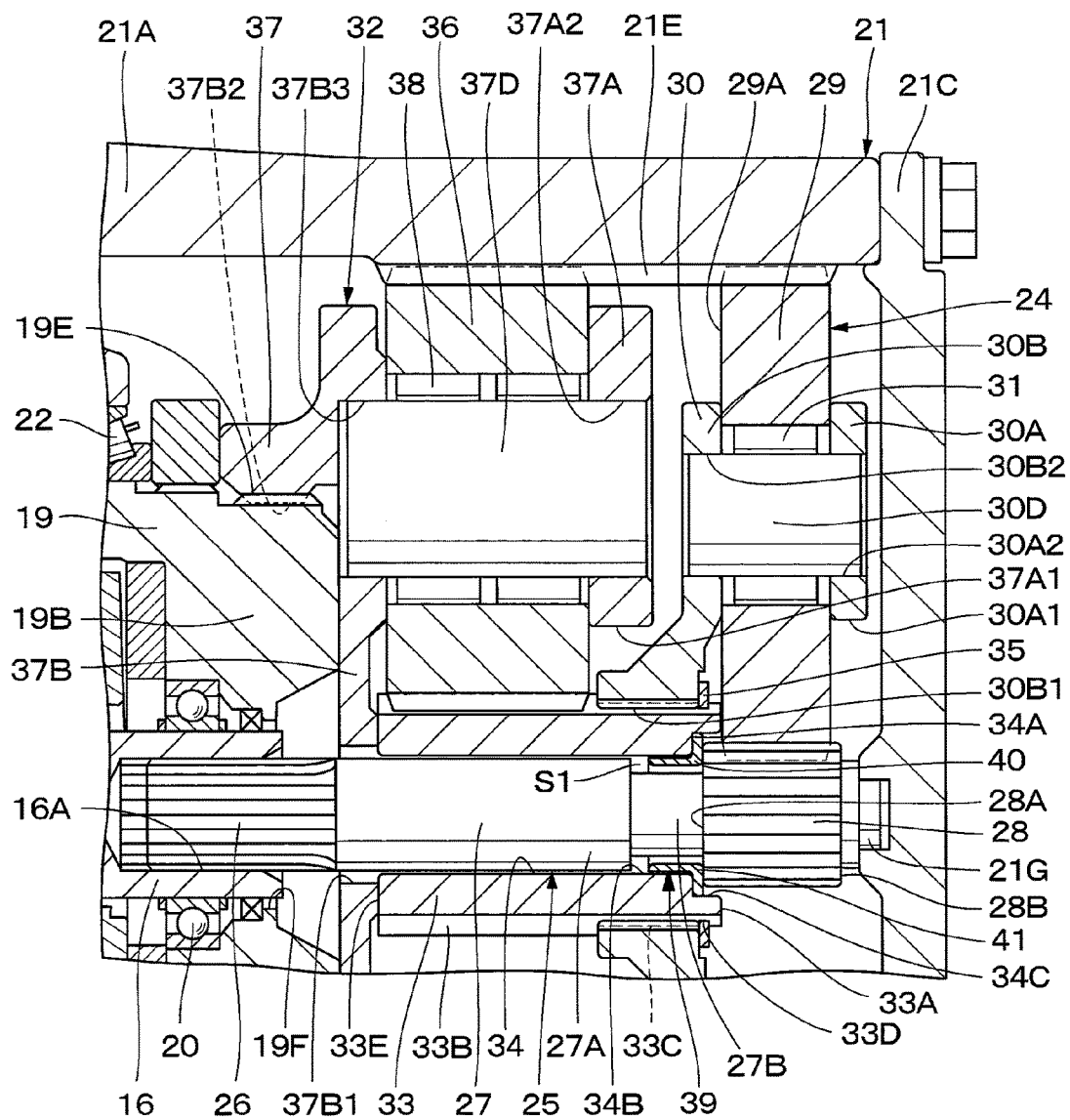
FIG. 3 is an enlarged sectional view of an essential part showing a rotational shaft, a first sun gear, a second sun gear, a sliding member and the like in FIG. 2.
Figure 4:
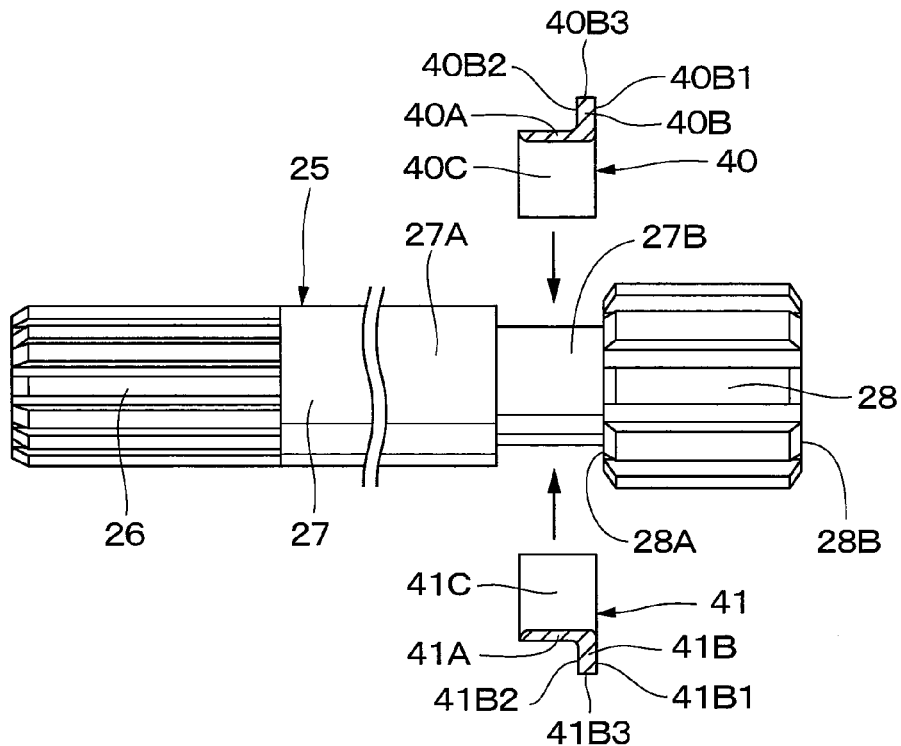
FIG. 4 is an exploded sectional view showing the rotational shaft and the sliding member.
Figure 5:
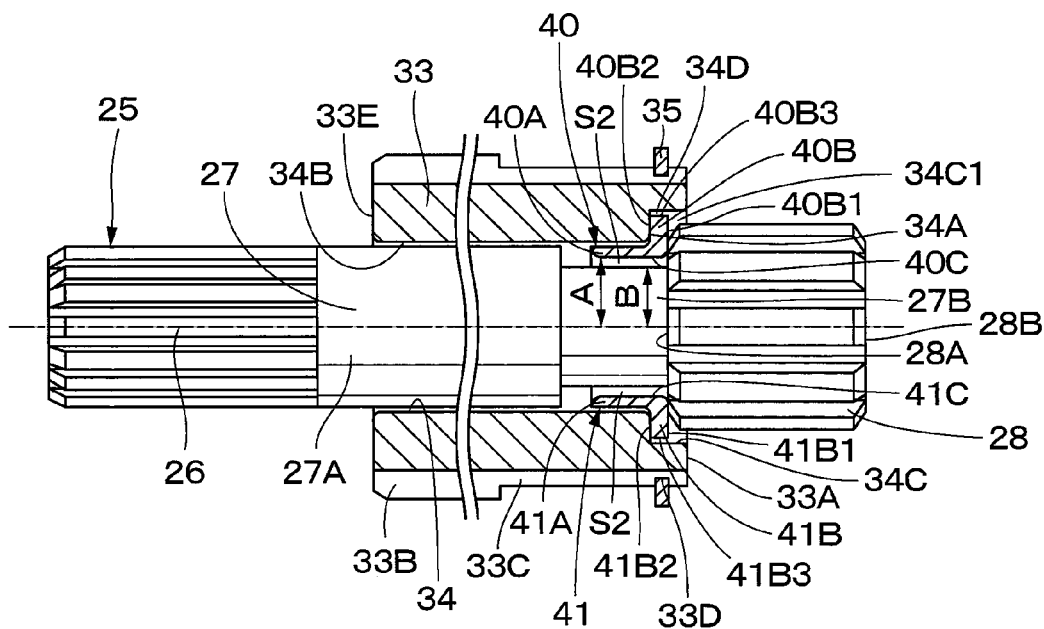
FIG. 5 is a sectional view showing a state where the rotational shaft to which the sliding member is assembled is inserted into a through hole of the second sun gear.
Figure 6:
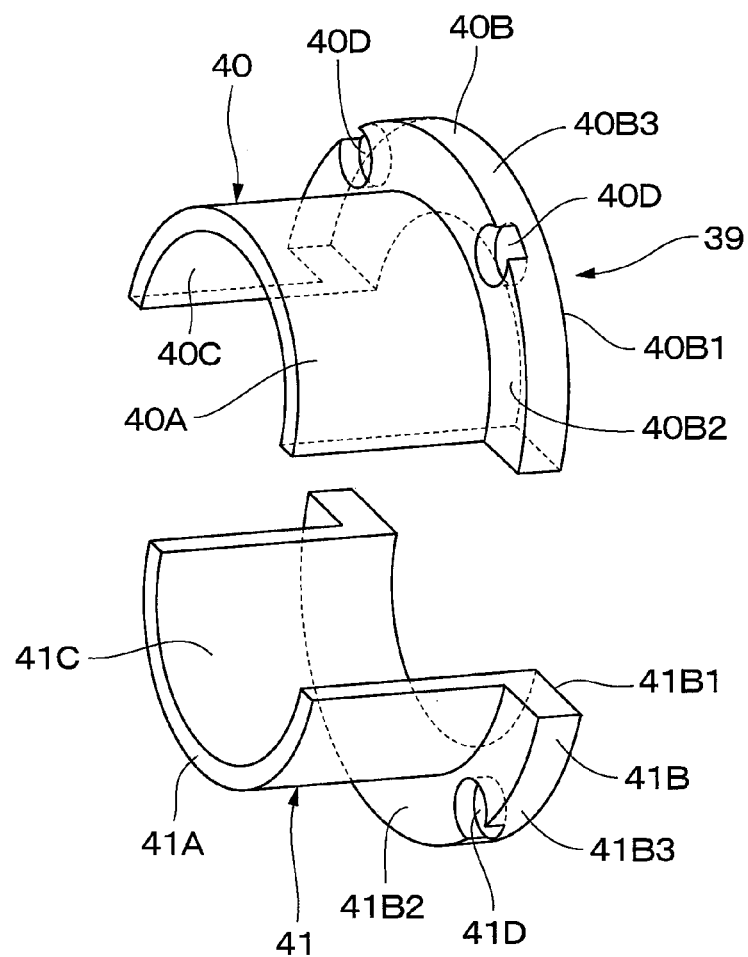
FIG. 6 is a perspective view showing the sliding member (first half bush, second half bush) as a single body.

As shown in FIG. 3 and FIG. 5, a gear meshing part 33B arranged on the one side (the hydraulic motor 12 side) in the axial direction, the carrier connecting part 33C made of the male spline arranged on the other side (the first sun gear 28 side) in the axial direction, and an annular groove 33D arranged in a portion close to the end surface 33A on the other side in the axial direction are provided on the outer peripheral side of the second sun gear 33. Each of the second planetary gears 36 is meshed with the gear meshing part 33B, and the female spline part 30B1 of the first carrier 30 is splined-connected with the carrier connecting part 33C. The end surface 33E on the other side in the axial direction of the second sun gear 33 is brought into contact with the second carrier 37 which will be described later.

An outer diameter dimension of the gear meshing part 33B is set larger than an outer diameter dimension of the carrier connecting part 33C, and a boundary part between the gear meshing part 33B and the carrier connecting part 33C is a stepped part. The first carrier 30 (female spline part 30B1) is spline-connected with the carrier connecting part 33C of the second sun gear 33, and a stop ring 35 as a positioning member is mounted on the annular groove 33D. Therefore, the first carrier 30 is sandwiched between the gear meshing part 33B and the stop ring 35, and the first carrier 30 is positioned in the axial direction.

On the other hand, a stepped part 34A is provided in the through hole 34 of the second sun gear 33, at a position close to the end surface 33A on the other side in the axial direction, that is, at a position deeper than the end surface 33A. The rotational shaft 25 is inserted in the through hole 34, the male spline part 26 side of the rotational shaft 25 from the stepped part 34A in the through hole 34 is formed as a small-diameter hole part 34B over the whole length, while the first sun gear 28 side is formed as a large-diameter hole part 34C having a diameter larger than that of the small-diameter hole part 34B. The sliding member 39 which will be described later is disposed on the stepped part 34A of the through hole 34. A hole diameter of the small-diameter hole part 34B is formed slightly larger than the outer diameter dimension of the male spline part 26 of the rotational shaft 25 and the large-diameter shaft 27A. On the other hand, a hole diameter of the large-diameter hole part 34C is formed larger than an addendum outer diameter dimension of the first sun gear 28. As a result, the end surface 28A of the first sun gear 28 is accommodated in the large-diameter hole part 34C.

In the cylinder part 21A of the rotating-side housing 21, a lubricant oil for smoothly driving each gear is filled up to the vicinity of an axis of the rotational shaft 25. That is, a lower half of a gap S1 formed between the through hole 34 and the small-diameter shaft 27B of the rotational shaft 25 is filled with a sufficient amount of the lubricant oil. Thereby, since the lubricant oil stored in this gap S1 can be made to flow into the periphery of the sliding member 39 which will be described later, a lubricated state of the sliding member 39 can be kept favorable.

The plurality of second planetary gears 36 is meshed with the second sun gear 33 and the internal gear 21E of the rotating-side housing 21. Each of the second planetary gears 36 is to rotate the rotating-side housing 21 by rotating around the second sun gear 33 and three pieces of them (only one of them is shown) are provided around the second sun gear 33, for example. Each of the second planetary gears 36 is to rotate the rotating-side housing 21 with a large torque by reducing the speed of the rotation transmitted from the first-stage planetary gear reduction mechanism 24 to the second sun gear 33.

The second carrier 37 is mounted on the fixed-side housing 19 in a non-rotation state and rotatably supports each of the second planetary gears 36. The second carrier 37 is constituted by an other-side support plate 37A and the one-side support plate 37B sandwiching each of the second planetary gears 36 from the axial direction, a plurality of connecting parts 37C connecting the other-side support plate 37A and the one-side support plate 37B, and a gear support shaft 37D rotatably supporting each of the second planetary gears 36 between the other-side support plate 37A and the one-side support plate 37B.

A sun gear through hole 37A1 is drilled at a center part of the other-side support plate 37A located on the other side in the axial direction, and the second sun gear 33 is inserted into the sun gear through hole 37A1. Three, for example, other-side support shaft fitting holes 37A2 (only one of them is shown) are drilled around the sun gear through hole 37A1 in the other-side support plate 37A by being located between each of the connecting parts 37C.

On the other hand, a rotational shaft through hole 37B1 and a female spline part 37B2 are formed at a center part of the one-side support plate 37B located on the one side in the axial direction. The rotational shaft 25 is inserted into the rotational shaft through hole 37B1, and the female spline part 37B2 is spline-connected with the male spline part 19E of the fixed-side housing 19. A plurality of (three, for example) one-side support shaft fitting holes 37B3 is drilled around the rotational shaft through hole 37B1 in the one-side support plate 37B, at a position corresponding to each of the other-side support shaft fitting holes 37A2 of the other-side support plate 37A.

Each of the gear support shafts 37D has the other side in the axial direction fitted in the other-side support shaft fitting hole 37A2 and the one side in the axial direction fitted into the one-side support shaft fitting hole 37B3. Accordingly, each of the gear support shafts 37D is supported on both sides by the other-side support plate 37A and the one-side support plate 37B and rotatably supports each of the second planetary gears 36 through a bearing 38.

Since the second carrier 37 has the female spline part 37B2 spline-connected with the male spline part 19E of the fixed-side housing 19, it is in the non-rotation state. As a result, after the rotation of the output shaft 16 of the hydraulic motor 12 has its speed reduced by the first-stage planetary gear reduction mechanism 24, it is configured to be further reduced by the second planetary gear 36 and to rotate the rotating-side housing 21 with a large torque.

Next, the sliding member 39 used in the first embodiment will be explained.

That is, the sliding member 39 is provided between the first sun gear 28 and the second sun gear 33. The sliding member 39 is made of two half bodies each having the same shape formed by a material of metal, resin or the like, for example. The sliding member 39 is fitted with the outer peripheral side of the small-diameter shaft 27B of the rotational shaft 25 from a radial direction and brings the first sun gear 28 and the second sun gear 33 into slidable contact with each other.

As shown in FIG. 3 to FIG. 6, the sliding member 39 is constituted by the first half bush 40 and the second half bush 41 combined into a cylindrical shape sandwiching the small-diameter shaft 27B of the rotational shaft 25. The first half bush 40 and the second half bush 41 have the same shape and are inserted into the through hole 34 of the second sun gear 33 in a state combined into a cylindrical shape. Thereby, it is constituted such that with the small-diameter shaft 27B located between the large-diameter shaft 27A of the rotational shaft 25 and the first sun gear 28, the sliding member 39 constituted having a stepped cylindrical shape by the first half bush 40 and the second half bush 41 can be fitted.

The first half bush 40 is constituted by a half cylindrical part 40A extending in the axial direction in the small-diameter hole part 34B of the through hole 34 and a flange part 40B having a semi-arc shape extending outward in the radial direction from the position of the stepped part 34A of the through hole 34. An axial length dimension of the first half bush 40 is set smaller than the axial length dimension of the small-diameter shaft 27B of the rotational shaft 25 (shaft part 27). The flange part 40B has a first sun gear abutting surface 40B1 with which the end surface 28A of the first sun gear 28 is brought into contact and a second sun gear abutting surface 40B2 located on a surface opposite to the first sun gear abutting surface 40B1 and with which the stepped part 34A of the second sun gear 33 is brought into contact.

On the other hand, the second half bush 41 is also constituted by a half cylindrical part 41A extending in the axial direction in the small-diameter hole part 34B of the through hole 34 and a flange part 41B having a semi-arc shape extending outward in the radial direction from the position of the stepped part 34A of the through hole 34 similarly to the first half bush 40. An axial length dimension of the second half bush 41 is set smaller than the axial length dimension of the small-diameter shaft 27B of the rotational shaft 25. The flange part 41B has a first sun gear abutting surface 41B1 with which the end surface 28A of the first sun gear 28 is brought into contact and a second sun gear abutting surface 41B2 with which the stepped part 34A of the second sun gear 33 is brought into contact.

The first and second half bushes 40 and 41 are fitted with the outer peripheral side of the small-diameter shaft 27B so as to sandwich the small-diameter shaft 27B of the rotational shaft 25 from the radial direction. In this state, the rotational shaft 25 is inserted into the through hole 34 of the second sun gear 33 from the male spline part 26 side. As a result, in a state where the half cylindrical parts 40A and 41A of the first and second half bushes 40 and 41 are fitted in the small-diameter hole part 34B of the second sun gear 33, the flange parts 40B and 41B are engaged with the stepped part 34A of the second sun gear 33. In this state, an annular gap 34D is formed (see FIG. 5) between the outer peripheral surfaces 40B3 and 41B3 of the flange parts 40B and 41B and an inner peripheral surface 34C1 of the large-diameter hole part 34C of the second sun gear 33.

The end surface 28A of the first sun gear 28 provided on the rotational shaft 25 and the stepped part 34A of the second sun gear 33 are brought into slidable contact with the flange parts 40B and 41B of the first and second half bushes 40 and 41. Accordingly, the first sun gear 28 and the rotational shaft 25 are positioned in the axial direction by the second sun gear 33. As described above, the small-diameter shaft 27B is provided on the rotational shaft 25, and the first and second half bushes 40 and 41 are fitted with the outer peripheral side of the small-diameter shaft 27B from the radial direction. As a result, even if the dimensional difference between the outer diameter dimension of the male spline part 26 of the rotational shaft 25 and the outer diameter dimension of the first sun gear 28 is small, it is constituted such that the end surface 28A of the first sun gear 28 and the stepped part 34A of the second sun gear 33 can be brought into contact with the flange parts 40B and 41B having large sliding surfaces.

Here, as shown in FIG. 5, a radial dimension A of an inner diameter side of the half cylindrical part 40A constituting the first half bush 40 and the half cylindrical part 41A constituting the second half bush 41 is formed having a value larger than a radial dimension B of the small-diameter shaft 27B of the rotational shaft 25. Accordingly, gaps S2 in the radial direction are respectively provided between the small-diameter shaft 27B of the rotational shaft 25 and the inner peripheral surface 40C of the first half bush 40 and between the small-diameter shaft 27B of the rotational shaft 25 and the inner peripheral surface 41C of the second half bush 41. Therefore, the first and second half bushes 40 and 41 and the small-diameter shaft 27B of the rotational shaft 25 are in the non-contact state and constituted such that acting of a large load from the rotational shaft 25 on the half cylindrical parts 40A and 41A of the first and second half bushes 40 and 41 can be suppressed.

Further, the half cylindrical parts 40A and 41A of the first and second half bushes 40 and 41 are fitted in the gap of the small-diameter hole part 34B of the through hole 34 of the second sun gear 33. As a result, between the outer peripheral surface of each of the half cylindrical parts 40A and 41A and the inner peripheral surface of the small-diameter hole part 34B, a slight gap is provided. Thereby, even in the case where a relative inclination occurs between the end surface 28A of the first sun gear 28 and the end surface 33A of the second sun gear 33 due to a manufacture tolerance or the like, for example, it is constituted such that this inclination can be absorbed by the gap formed between the half cylindrical parts 40A and 41A of the first and second half bushes 40 and 41 and the inner peripheral surface of the small-diameter hole part 34B of the second sun gear 33.

On the other hand, two recessed parts 40D each forming a substantially circular shape are provided in the flange part 40B of the first half bush 40, on the second sun gear abutting surface 40B2 side in a circumferential direction at an interval. Each of the recessed parts 40D communicates between the outer peripheral surface 40B3 of the flange part 40B and the second sun gear abutting surface 40B2. Two recessed parts 41D (only one of them is shown) each forming a substantially circular shape are provided in the flange part 41B of the second half bush 41, on the second sun gear abutting surface 41B2 side, too, in the circumferential direction at an interval. Each of the recessed parts 41D communicates between the outer peripheral surface 41B3 of the flange part 41B and the second sun gear abutting surface 41B2. As a result, the lubricant oil filled in the rotating-side housing 21 is led into each of the recessed parts 40D and 41D through the gap 34D formed between the outer peripheral surfaces 40B3 and 41B3 of the each of the flange parts 40B and 41B and the inner peripheral surface 34C1 of the large-diameter hole part 34C of the second sun gear 33.

The lubricant oil having been led into each of the recessed parts 40D and 41D is supplied to a sliding portion between the second sun gear abutting surfaces 40B2 and 41B2 provided on each of the flange parts 40B and 41B and the stepped part 34A of the second sun gear 33. In this case, into the gap 34D, the lubricant oil ejected by meshing between the first sun gear 28 and each of the first planetary gears 29 is led. Accordingly, the sliding portion between the second sun gear abutting surfaces 40B2 and 41B2 provided on each of the flange parts 40B and 41B and the stepped part 34A of the second sun gear 33 is efficiently lubricated by the lubricant oil.

Next, an assembling procedure of the reduction device 18 according to the first embodiment will be explained.

Figure 11:
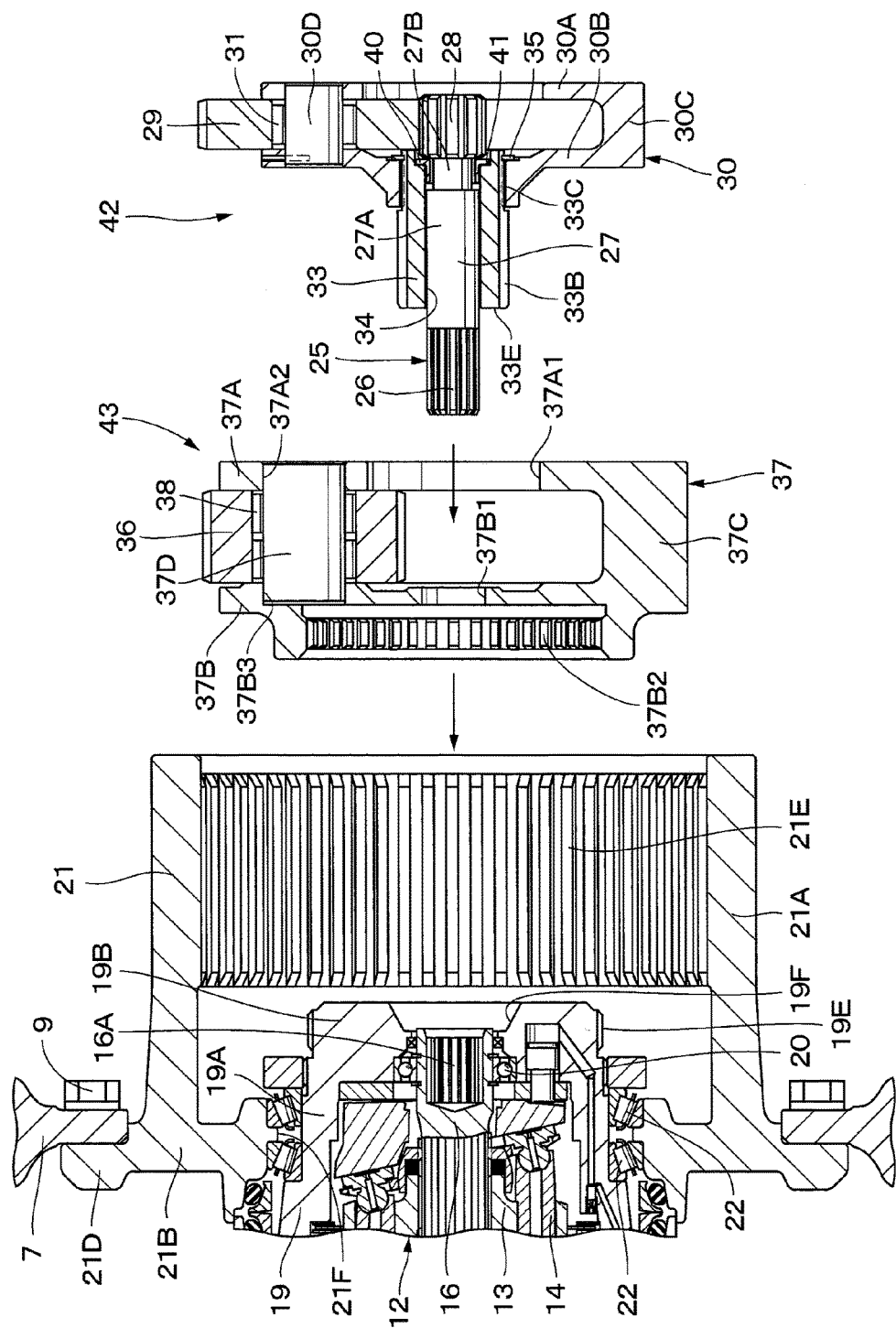
FIG. 11 is an exploded sectional view showing that first-stage and second-stage planetary gear reduction mechanisms are removed from a rotating-side housing.

In the case where the reduction device 18 is to be assembled, as shown in FIG. 11, for example, a first assembly 42 composed of the rotational shaft 25, the first planetary gear 29, the first carrier 30, the second sun gear 33, the first and second half bushes 40 and 41 and the like and a second assembly 43 composed of the second planetary gear 36, the second carrier 37 and the like are assembled separately. After that, these first and second assemblies 42 and 43 are assembled into the fixed-side housing 19 and the rotating-side housing 21.

Figure 7:
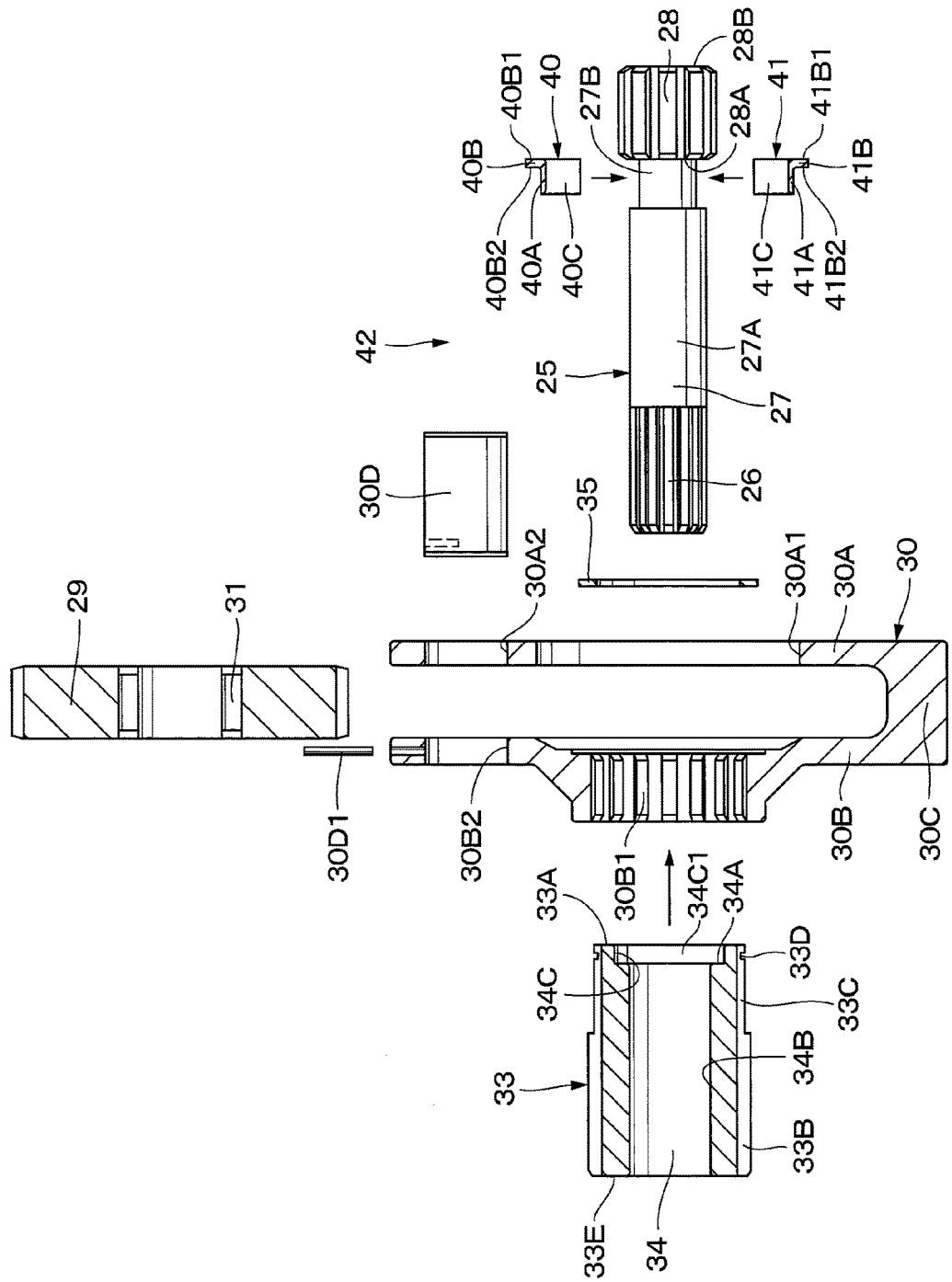
FIG. 7 is an exploded sectional view of a first assembly showing a state where the rotational shaft, the first sun gear, a first planetary gear, and the second sun gear are removed from a first carrier.
Figure 8:
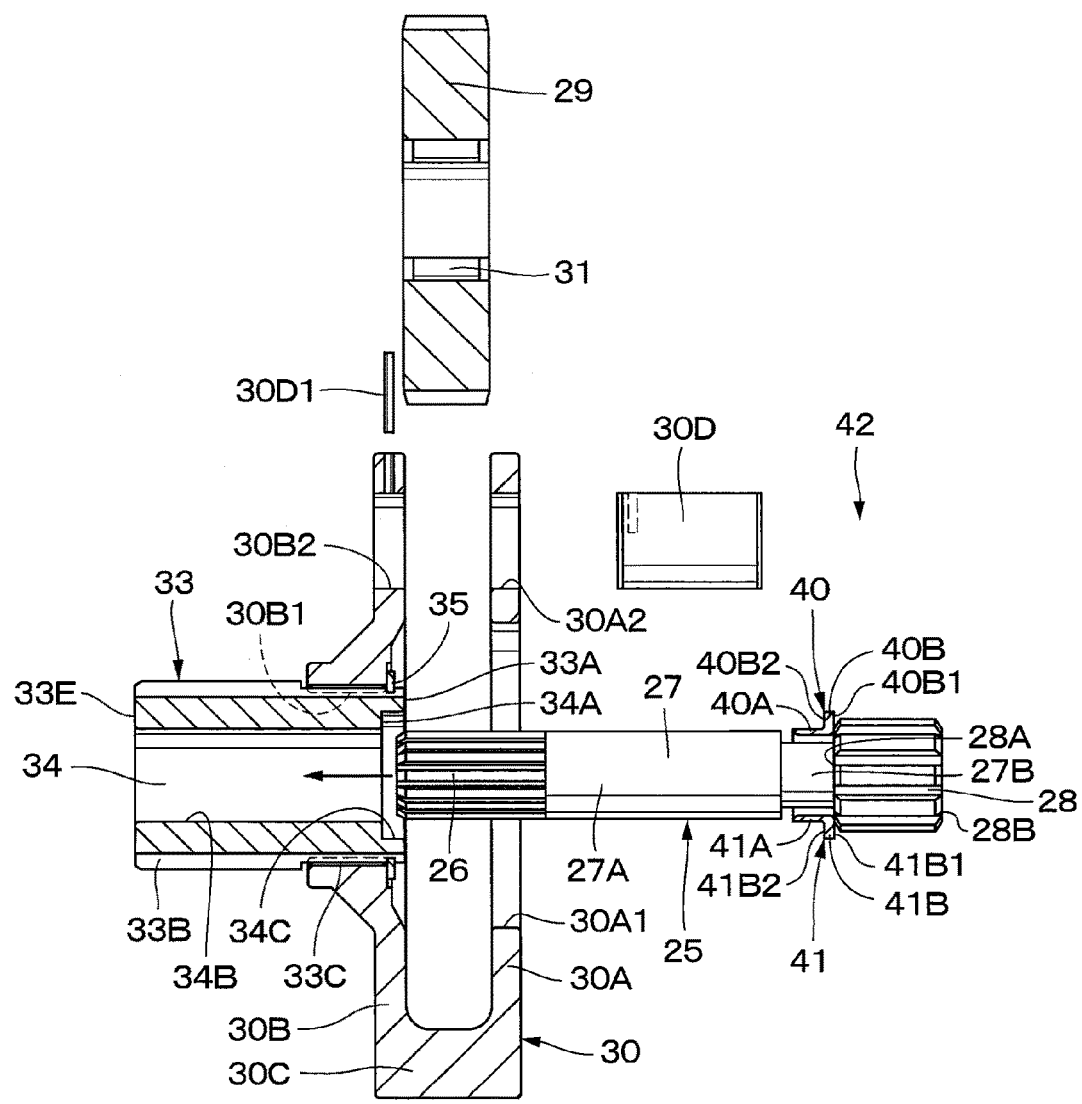
FIG. 8 is an exploded sectional view showing a state where the second sun gear is assembled to the first carrier from the state shown in FIG. 7.

In the case where the first assembly 42 is to be assembled, as shown in FIG. 7 and FIG. 8, the carrier connecting part 33C of the second sun gear 33 is spline-connected with the female spline part 30B1 of the first carrier 30, and the stop ring 35 is mounted on the annular groove 33D of the second sun gear 33. Thereby, the first carrier 30 is sandwiched between the gear meshing part 33B and the stop ring 35, and the first carrier 30 is positioned in the axial direction.

Then, the first half bush 40 and the second half bush 41 are fitted with the small-diameter shaft 27B of the rotational shaft 25 from the outer side in the radial direction. In this state, the male spline part 26 side of the rotational shaft 25 is inserted into the rotational shaft through hole 30A1 of the first carrier 30 and the through hole 34 of the second sun gear 33. As a result, the half cylindrical parts 40A and 41A of the first and second half bushes 40 and 41 are inserted (fitted in the gap) in the small-diameter hole part 34B of the through hole 34, and the flange parts 40B and 41B of the first and second half bushes 40 and 41 are engaged with the stepped part 34A of the second sun gear 33.

Figure 9:
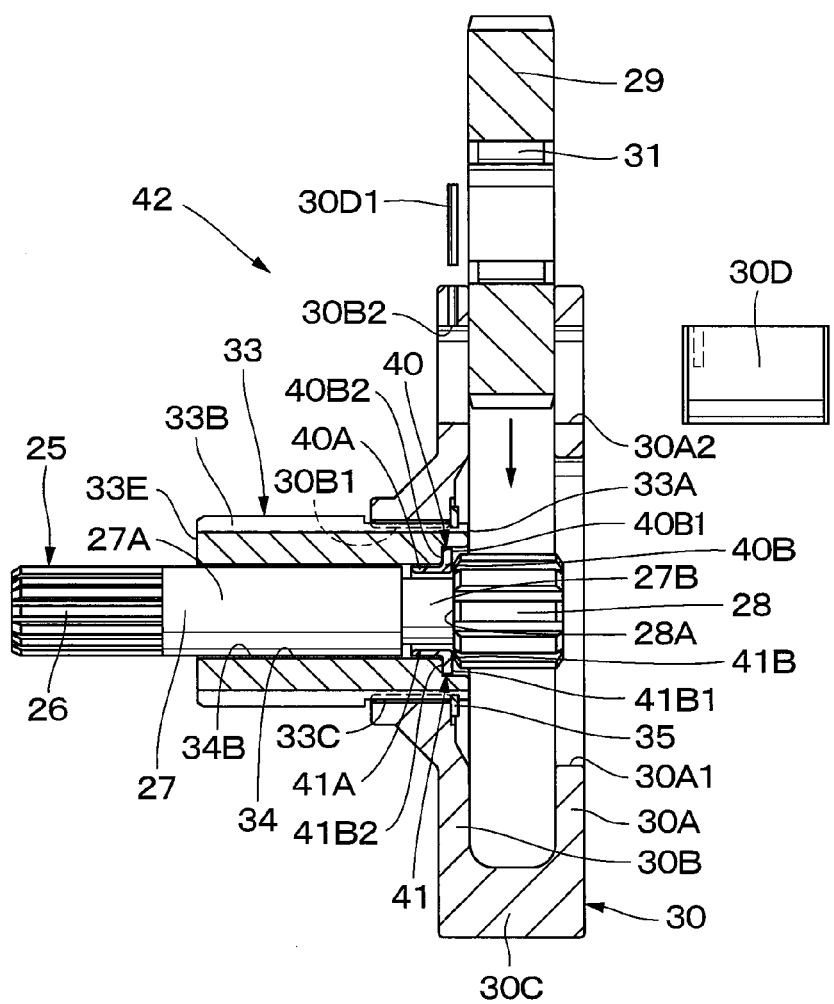
FIG. 9 is an exploded sectional view showing a state where the sliding member is fitted with a small-diameter shaft of the rotational shaft from the state shown in FIG. 8 and the rotational shaft is inserted into the through hole of the second sun gear.
Figure 10:
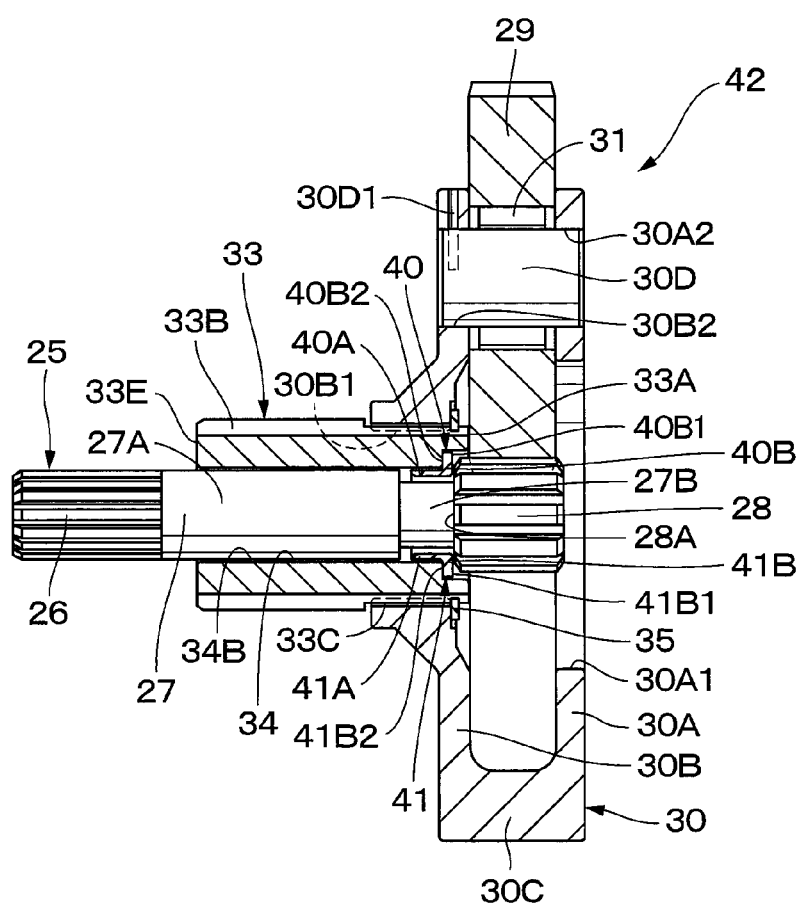
FIG. 10 is a sectional view of a first assembly showing a state where the first planetary gear is assembled to the first carrier from the state shown in FIG. 9.

Subsequently, as shown in FIG. 9, the first planetary gear 29 on which the bearing 31 is mounted on the inner peripheral side is inserted between the other-side support plate 30A and the one-side support plate 30B of the first carrier 30. Then, the gear support shaft 30D is fitted in the other-side support-shaft fitting hole 30A2 of the other-side support plate 30A, the bearing 31, and the one-side support shaft fitting hole 30B2 of the one-side support plate 30B and retained by a fixing pin 30D1. As a result, as shown in FIG. 10, the first assembly 42 is assembled.

On the other hand, in the case where the second assembly 43 is to be assembled, as shown in FIG. 11, the second planetary gear 36 on which the bearing 38 is mounted on the inner peripheral side is inserted between the other-side support plate 37A and the one-side support plate 37B of the second carrier 37. Then, the gear support shaft 37D is fitted in the other-side support shaft fitting hole 37A2 of the other-side support plate 37A, the bearing 38, and the one-side support shaft fitting hole 37B3 of the one-side support plate 37B and is retained by a fixing pin (not shown). Thereby, the second assembly 43 is assembled.

Subsequently, the first assembly 42 and the second assembly 43 are assembled to the rotating-side housing 21. In this case, as shown in FIG. 11, the second assembly 43 is assembled to the rotating-side housing 21 in a state where the lid part 21C of the rotating-side housing 21 is removed.

Specifically, in a state where each of the second planetary gears 36 provided on the second assembly 43 is meshed with the internal gear 21E of the rotating-side housing 21, the second carrier 37 is inserted into the cylinder part 21A of the rotating-side housing 21. Then, the female spline part 37B2 of the second carrier 37 is spline-connected with the male spline part 19E of the fixed-side housing 19, and the second carrier 37 is brought into contact with the bottom part 19B of the fixed-side housing 19. Therefore, the second carrier 37 is mounted on the fixed-side housing 19 in the non-rotation state while rotatably supporting each of the second planetary gears 36.

Subsequently, in the case where the first assembly 42 is to be assembled to the rotating-side housing 21, the second sun gear 33 is inserted into the sun gear through hole 37A1 of the second carrier 37. In this state, the gear meshing part 33B of the second sun gear 33 is meshed with each of the second planetary gears 36, while the first carrier 30 is inserted into the cylinder part 21A of the rotating-side housing 21. Then, each of the first planetary gears 29 is meshed with the internal gear 21E of the rotating-side housing 21, while the male spline part 26 of the rotational shaft 25 is spline-connected with the female spline part 16A provided on the output shaft 16 of the hydraulic motor 12. Moreover, the end surface 33E on the one side in the axial direction of the second sun gear 33 is brought into contact with the one-side support plate 37B of the second carrier 37.

As described above, in a state where the first assembly 42 and the second assembly 43 are assembled in the cylinder part 21A of the rotating-side housing 21, the lid part 21C is mounted on the cylinder part 21A of the rotating-side housing 21. As a result, the first-stage planetary gear reduction mechanism 24 and the second-stage planetary gear reduction mechanism 32 are assembled in the cylinder part 21A of the rotating-side housing 21, and the reduction device 18 is assembled.

The reduction device 18 according to the first embodiment has the constitution as described above, and its operation will be explained below. When the hydraulic motor 12 is operated and the output shaft 16 is rotated, the rotation of this output shaft 16 is output to the first sun gear 28 constituting the first-stage planetary gear reduction mechanism 24 through the rotational shaft 25. When the first sun gear 28 is rotated, each of the first planetary gears 29 revolves while rotating around the first sun gear 28, and revolution of each of the first planetary gears 29 is transmitted to the first carrier 30.

The rotation whose speed was reduced of the first carrier 30 is transmitted to the second sun gear 33 constituting the second-stage planetary gear reduction mechanism 32. Thus, each of the second planetary gears 36 meshed with the second sun gear 33 rotates while being meshed with the internal gear 21E of the rotating-side housing 21. Here, the second carrier 37 supporting each of the second planetary gears 36 is spline-connected with the fixed-side housing 19. Accordingly, the rotation of each of the second planetary gears 36 is transmitted to the rotating-side housing 21 through the internal gear 21E.

As described above, the rotation of the hydraulic motor 12 has its speed reduced in two stages by the first-stage planetary gear reduction mechanism 24 and the second-stage planetary gear reduction mechanism 32 and then, is transmitted to the rotating-side housing 21. Thereby, the rotating-side housing 21 to which the drive wheel 7 is fixed is rotated with a large torque. As a result, the crawler belt 8 wound between the idler wheel 6 and the drive wheel 7 is driven, and the hydraulic excavator 1 is made to travel.

In this case, the flange parts 40B and 41B of the first and second half bushes 40 and 41 are provided between the first sun gear 28 provided on the rotational shaft 25 and the second sun gear 33. The end surface 28A on the one side in the axial direction of the first sun gear 28 is brought into contact with each of the flange parts 40B and 41B. The end surface 28B on the other side in the axial direction is brought into contact with the sliding body 21G provided on the rotating-side housing 21 (lid part 21C). Therefore, the first sun gear 28 and the second sun gear 33 can relatively rotate smoothly through the flange parts 40B and 41B of the first and second half bushes 40 and 41. Further, the first sun gear 28 and the rotational shaft 25 are positioned in the axial direction between the first and second half bushes 40 and 41 and the sliding body 21G of the rotating-side housing 21.

In this case, the gaps S2 in the radial direction are provided between the inner peripheral surfaces 40C and 41C of the half cylindrical parts 40A and 41A constituting the first and second half bushes 40 and 41 and the outer peripheral surface of the small-diameter shaft 27B of the rotational shaft 25, respectively. Accordingly, the first half bush 40 as well as the second half bush 41 and the small-diameter shaft 27B of the rotational shaft 25 are in the non-contact state. As a result, while the reduction device 18 is being operated, even in the case where a shaft core of the rotational shaft 25 and a shaft core of the second sun gear 33 are departed from each other, contact between the half cylindrical parts 40A and 41A of the first and second half bushes 40 and 41 and the small-diameter shaft 27B can be suppressed. Therefore, acting of a large load on the first and second half bushes 40 and 41 from the rotational shaft 25 can be suppressed and thus, the lives of the first and second half bushes 40 and 41 can be improved.

The first and second half bushes 40 and 41 are constituted by the half cylindrical parts 40A and 41A inserted into the small-diameter hole part 34B of the second sun gear 33 and the flange parts 40B and 41B engaged with the stepped part 34A of the second sun gear 33. As a result, the hole diameter of the small-diameter hole part 34B into which the half cylindrical parts 40A and 41A are inserted can be made as small as possible. Accordingly, a thickness from the outer peripheral side of the second sun gear 33 to the through hole 34 can be made larger (thicker). As a result, even in the case where a large torque acts on the second sun gear 33 from the first carrier 30, torsional strength of the second sun gear 33 can be sufficiently ensured. Therefore, durability of the second sun gear 33 can be improved.

The first and second half bushes 40 and 41 can sufficiently ensure the sliding surfaces with the first sun gear 28 by the flange parts 40B and 41B. Thereby, the first sun gear 28 can smoothly rotate with respect to the flange parts 40B and 41B in the state positioned in the axial direction by the first and second half bushes 40 and 41. Accordingly, reliability of the reduction device 18 can be improved.

Moreover, the half cylindrical parts 40A and 41A of the first and second half bushes 40 and 41 are fitted in the gap of the small-diameter hole part 34B of the through hole 34 in the second sun gear 33, and a slight gap is provided between the outer peripheral surface of each of the half cylindrical parts 40A and 41A and the inner peripheral surface of the small-diameter hole part 34B. As a result, even in the case where a relative inclination occurs between the end surface 28A of the first sun gear 28 and the end surface 33A of the second sun gear 33 due to a manufacture tolerance or the like, this inclination can be absorbed by the gap formed between the half cylindrical parts 40A and 41A of the first and second half bushes 40 and 41 and the inner peripheral surface of the small-diameter hole part 34B of the second sun gear 33. As a result, uneven abrasion of the flange parts 40B and 41B of the first and second half bushes 40 and 41 due to sliding with the first sun gear 28 can be suppressed. Accordingly, the lives of the first and second half bushes 40 and 41 can be improved.

Thus, according to the reduction device 18 according to the first embodiment, the flange parts 40B and 41B of the first and second half bushes 40 and 41 are provided between the first sun gear 28 provided on the rotational shaft 25 and the second sun gear 33. The end surface 28A on the one side in the axial direction of the first sun gear 28 is brought into contact with each of the flange parts 40B and 41B, while the end surface 28B on the other side in the axial direction is brought into contact with the sliding body 21G provided on the rotating-side housing 21 (lid part 21C). Thereby, the first sun gear 28 and the rotational shaft 25 can be reliably positioned in the axial direction. Accordingly, even in the case where the force in the axial direction acts on the rotational shaft 25 by meshing between the first sun gear 28 and the first planetary gear 29, this axial force can be reliably received by the first and second half bushes 40 and 41.

Figure 2:
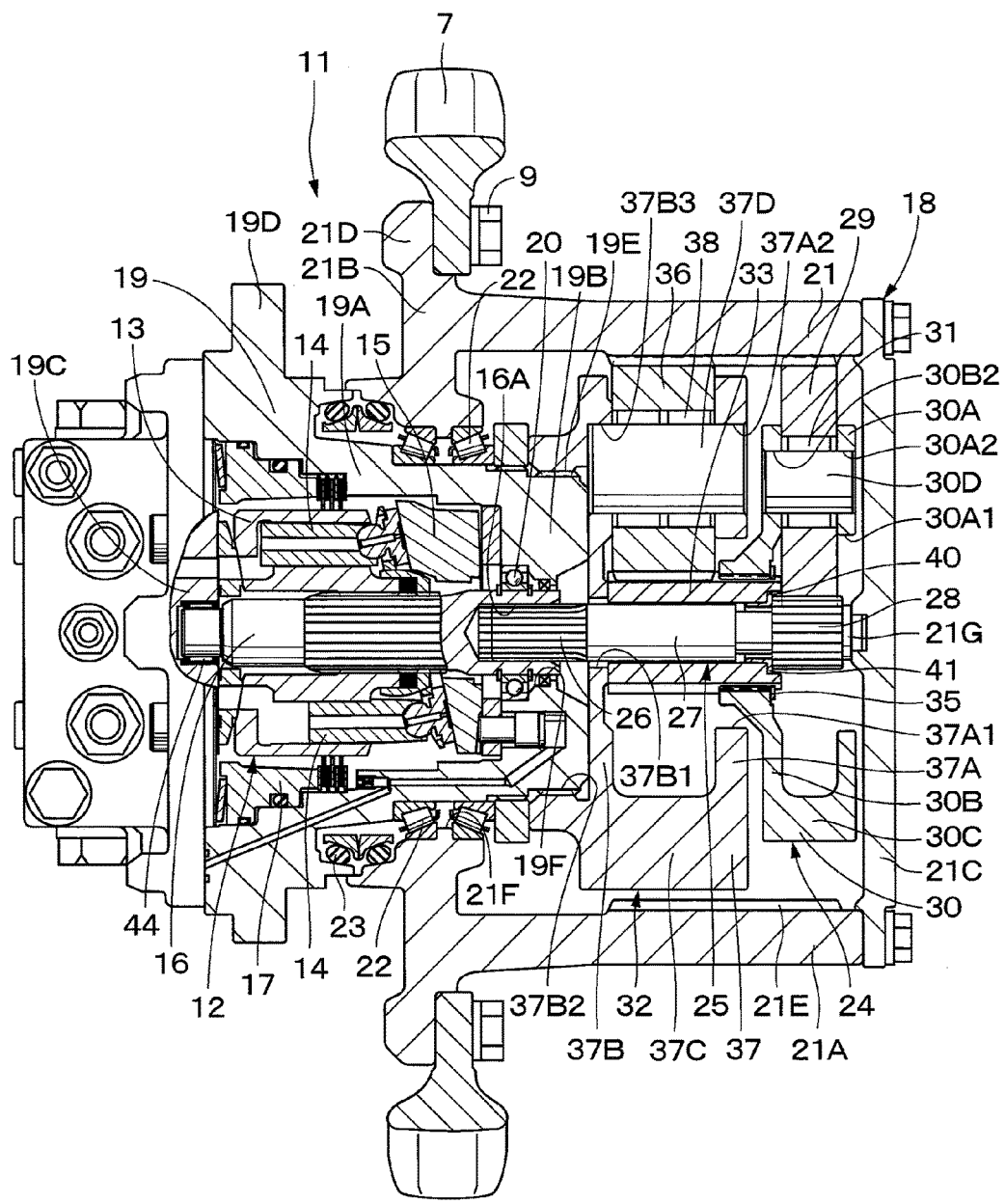
FIG. 2 is a sectional view of a traveling device of a lower traveling structure when seen from an arrow II-II direction in FIG. 1.

Thus, as compared with the constitution in which the rotational shaft is positioned in the axial direction by the output shaft of the hydraulic motor as in the prior-art technology, for example, there is no need to receive the axial force acting on the rotational shaft by the output shaft. Therefore, the reduction device 18 according to the first embodiment can use the bearing 20 constituted by a ball bearing, a roller bearing or the like which does not require pressurization control in order to rotatably support the output shaft 16 of the hydraulic motor 12 with respect to the bottom part 19B of the fixed-side housing 19 as shown in FIG. 2. On the other hand, in order to rotatably support the output shaft 16 with respect to the lid member 19C of the fixed-side housing 19, a needle bearing 44 which is not subjected to a thrust force can be used. As a result, a manufacturing cost of the reduction device 18 can be reduced.

Moreover, during traveling of the hydraulic excavator 1, even in the case where rocks or the like collides against the lid part 21C of the rotating-side housing 21 and a load toward an inner side of the rotating-side housing 21 acts on the lid part 21C, the load transmitted to the first sun gear 28 through the sliding body 21G from the lid part 21C can be reliably received by the first and second half bushes 40 and 41. As a result, transmission of the load from the lid part 21C to the output shaft 16 of the hydraulic motor 12 or the bearing 20 through the rotational shaft 25 can be suppressed, and durability of the bearing 20 or the hydraulic motor 12 can be improved.

In this case, in the reduction device 18 according to the first embodiment, the small-diameter shaft 27B is provided on the rotational shaft 25, and the first and second half bushes 40 and 41 are fitted with the outer peripheral side of the small-diameter shaft 27B from the radial direction. Thereby, even in the case where the dimensional difference between the outer diameter dimension of the male spline part 26 of the rotational shaft 25 and the outer diameter dimension of the first sun gear 28 is small, the end surface 28A of the first sun gear 28 and the stepped part 34A of the second sun gear 33 can be brought into contact with the flange parts 40B and 41B having the large sliding surfaces of the first and second half bushes 40 and 41.

Thus, by reducing the outer diameter dimension of the first sun gear 28 and by decreasing the number of teeth, the teeth number ratio with the internal gear 21E of the rotating-side housing 21 can be increased. As a result, the speed reduction ratio of the first-stage planetary gear reduction mechanism 24 can be set large, and freedom in designing the first-stage and second-stage planetary gear reduction mechanisms 24 and 32 can be improved.

On the other hand, the gear meshing part 33B with which the second planetary gear 36 is meshed, the carrier connecting part 33C adjacent to the gear meshing part 33B and with which the female spline part 30B1 of the first carrier 30 is spline-connected, and the annular groove 33D arranged in a portion close to the end surface 33A of the second sun gear 33 are provided on the outer peripheral side of the second sun gear 33. Thereby, the first carrier 30 (female spline part 30B1) is spline-connected with the carrier connecting part 33C, and the stop ring 35 is mounted on the annular groove 33D, whereby the first carrier 30 can be positioned in the axial direction between the gear meshing part 33B and the stop ring 35.

As a result, each of the first planetary gears 29 supported by the first carrier 30 can be meshed with the internal gear 21E of the rotating-side housing 21 and the first sun gear 28 at a proper position at all times. Accordingly, durability of the first sun gear 28, the first planetary gear 29, and the internal gear 21E meshed with each other can be improved.

Figure 12:
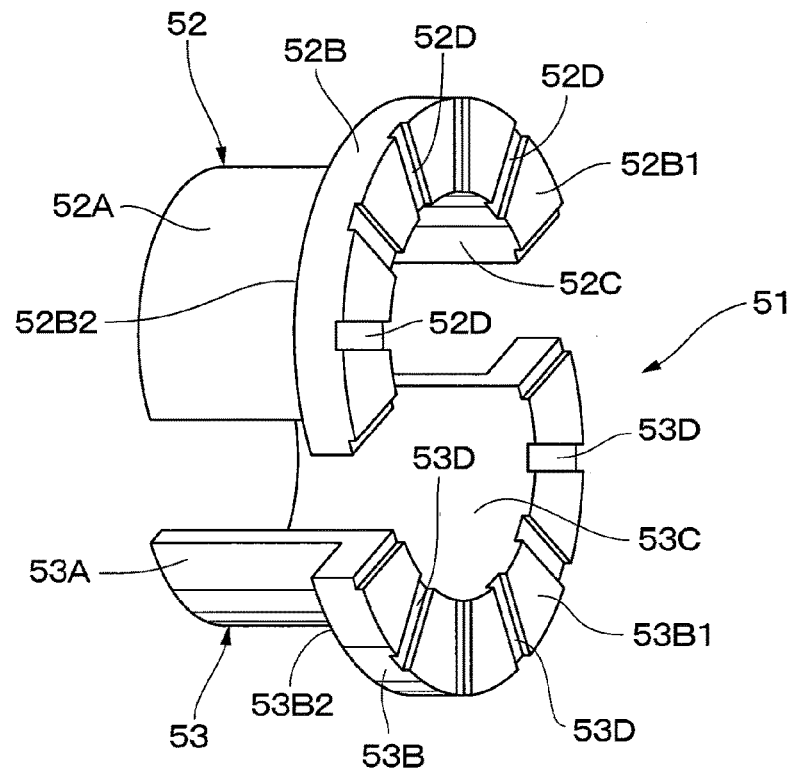
FIG. 12 is a perspective view showing the sliding member (first half bush, a second half bush) according to a second embodiment of the present invention as a single body.
Figure 13:
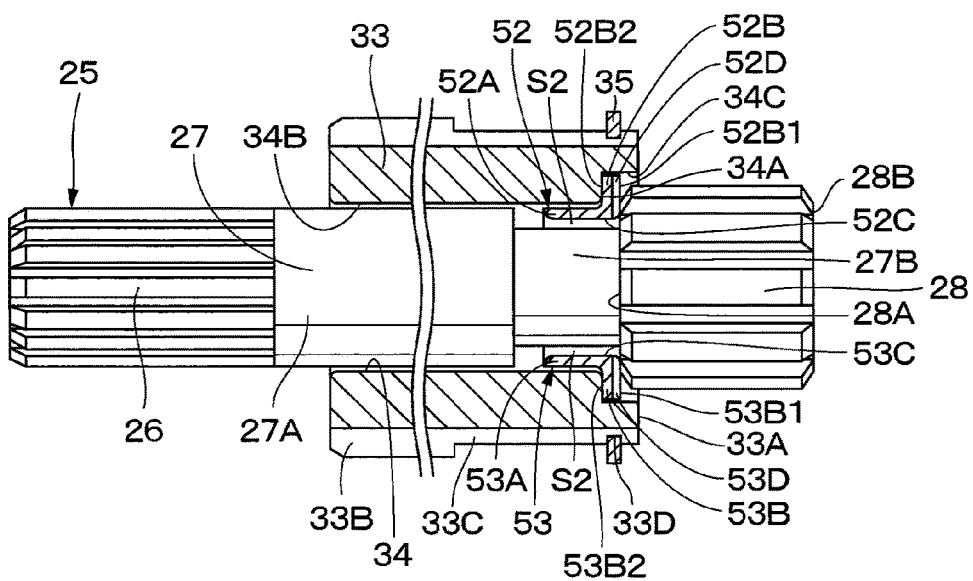
FIG. 13 is a sectional view similar to FIG. 5 showing a state where the rotational shaft on which the sliding member according to the second embodiment is mounted is inserted into the through hole of the second sun gear.

Next, FIG. 12 and FIG. 13 show a second embodiment of the present invention. A characteristic of the second embodiment is that a projection and recess surface is provided on the flange parts of the first and second half bushes constituting the sliding member. It should be noted that in the second embodiment, the same reference numerals are given to the same constituent elements in the aforementioned first embodiment, and the explanation will be omitted.

In the figures, a sliding member 51 is used in this embodiment instead of the sliding member 39 according to the first embodiment. This sliding member 51 is constituted by a first half bush 52 and a second half bush 53 having the same shape similarly to the sliding member 39 according to the first embodiment.

The first half bush 52 is constituted by a half cylindrical part 52A extending in the axial direction in the small-diameter hole part 34B of the through hole 34 in the second sun gear 33 and a flange part 52B having a semi-arc shape extending outward in the radial direction from the position of the stepped part 34A of the through hole 34. The gap S2 in the radial direction is provided between an inner peripheral surface 52C of the first half bush 52 and the small-diameter shaft 27B of the rotational shaft 25, and a slight gap is provided between the outer peripheral surface of the half cylindrical part 52A and the inner peripheral surface of the small-diameter hole part 34B. The flange part 52B has a first sun gear abutting surface 52B1 with which the end surface 28A of the first sun gear 28 is brought into contact and a second sun gear abutting surface 52B2 located on a surface opposite to the first sun gear abutting surface 52B1 and with which the stepped part 34A of the second sun gear 33 is brought into contact.

Here, a plurality of groove-shaped concave parts 52D recessed toward the second sun gear abutting surface 52B2 are provided in the first sun gear abutting surface 52B1 of the flange part 52B at intervals in the circumferential direction. That is, the first sun gear abutting surface 52B1 is formed as the projection and recess surface by each of the concave parts 52D. Thereby, it is constituted such that, when the end surface 28A of the first sun gear 28 is brought into contact with the first sun gear abutting surface 52B1, contact friction (friction resistance) between the both is increased.

The second half bush 53 is also constituted by a half cylindrical part 53A and a flange part 53B similarly to the first half bush 52. The gap S2 in the radial direction is provided between an inner peripheral surface 53C of the second half bush 53 and the small-diameter shaft 27B of the rotational shaft 25, and a slight gap is provided between the outer peripheral surface of the half cylindrical part 53A and the inner peripheral surface of the small-diameter hole part 34B. The flange part 53B has a first sun gear abutting surface 53B1 with which the end surface 28A of the first sun gear 28 is brought into contact and a second sun gear abutting surface 53B2 with which the stepped part 34A of the second sun gear 33 is brought into contact.

A plurality of groove-shaped concave parts 53D are provided in the first sun gear abutting surface 53B1 of the flange part 53B at intervals in the circumferential direction. That is, the first sun gear abutting surface 53B1 is formed as the projection and recess surface by each of the concave parts 53D. As a result, it is constituted such that, when the end surface 28A of the first sun gear 28 is brought into contact with the first sun gear abutting surface 53B1, contact friction (friction resistance) between the both is increased.

The reduction device according to the second embodiment has the sliding member 51 as described above, and its basic operation does not have a particular difference from that according to the first embodiment.

Here, when the first sun gear 28 is rotated during the operation of the reduction device, the flange parts 52B and 53B of the first and second half bushes 52 and 53 are brought into slidable contact with the first sun gear 28 and the second sun gear 33. In this case, there is a concern that the first sun gear abutting surfaces 52B1 and 53B1 of the flange parts 52B and 53B are worn earlier due to intermittent slidable contact with an end portion (edge) of each tooth of the first sun gear 28.

In response to that, in the second embodiment, the plurality of concave parts 52D and 53D are respectively provided in the first sun gear abutting surfaces 52B1 and 53B1 with which the first sun gear 28 is brought into slidable contact in the flange parts 52B and 53B of the first and second half bushes 52 and 53. As a result, the friction resistance between the first sun gear abutting surfaces 52B1 and 53B1 of the first and second half bushes 52 and 53 and the end surface 28A of the first sun gear 28 is increased. Accordingly, the first and second half bushes 52 and 53 are dragged by the first sun gear 28.

Thus, the first and second half bushes 52 and 53 actively slide with respect to the stepped part 34A of the second sun gear 33 formed of a flat surface, and sliding with the first sun gear 28 is suppressed. As a result, earlier abrasion of the first and second half bushes 52 and 53 by the edge of each tooth of the first sun gear 28 can be suppressed, and the lives the first and second half bushes 52 and 53 can be improved.

Figure 14:
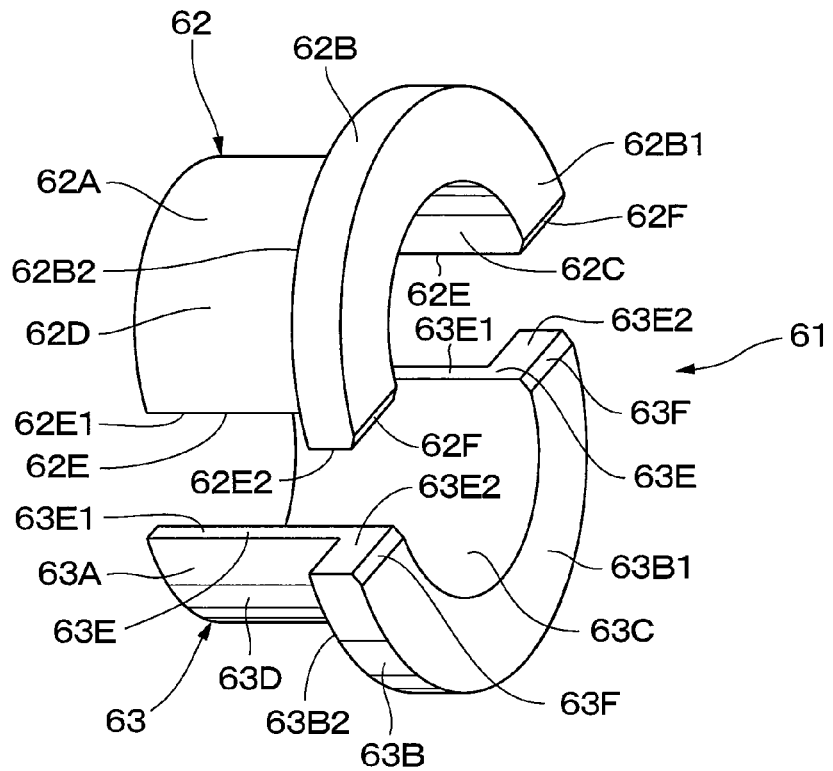
FIG. 14 is a perspective view showing the sliding member (first half bush, a second half bush) according to a third embodiment of the present invention as a single body.
Figure 15:
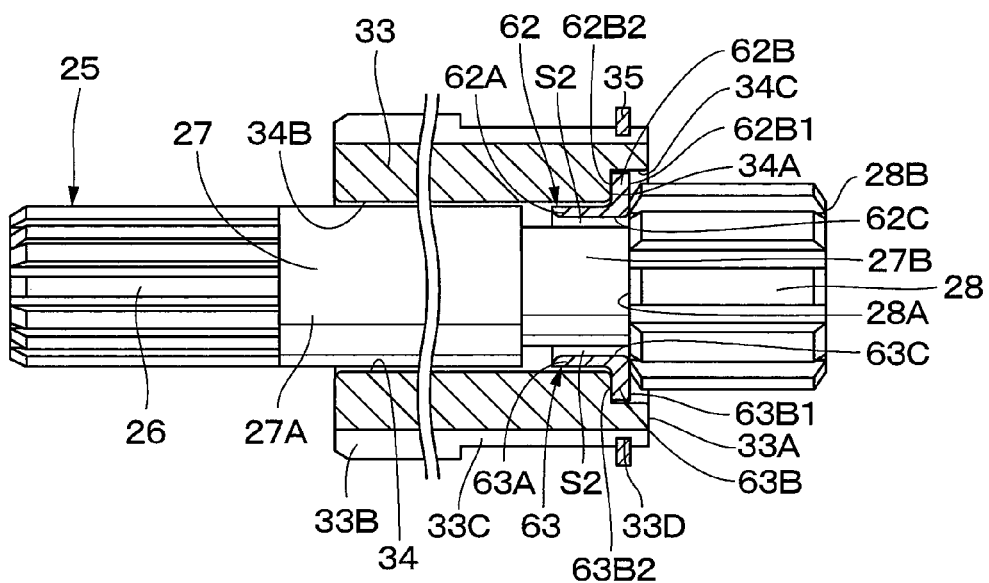
FIG. 15 is a sectional view similar to FIG. 5 showing a state where the rotational shaft on which the sliding member according to the third embodiment is mounted is inserted into the through hole of the second sun gear.

Next, FIG. 14 and FIG. 15 show a third embodiment of the present invention. A characteristic of the third embodiment is that a chamfered part is provided on the first half bush and the second half bush constituting the sliding member. It should be noted that in the third embodiment, the same reference numerals are given to the same constituent elements in the aforementioned first embodiment, and the explanation will be omitted.

In the figures, a sliding member 61 is used in this embodiment instead of the sliding member 39 according to the first embodiment. This sliding member 61 is constituted by a first half bush 62 and a second half bush 63 having the same shape similarly to the sliding member 39 according to the first embodiment.

The first half bush 62 is constituted by a half cylindrical part 62A extending in the axial direction in the small-diameter hole part 34B of the through hole 34 in the second sun gear 33 and a flange part 62B having a semi-arc shape extending outward in the radial direction from the position of the stepped part 34A of the through hole 34. The gap S2 in the radial direction is provided between an inner peripheral surface 62C of the first half bush 62 and the small-diameter shaft 27B of the rotational shaft 25, and a slight gap is provided between the outer peripheral surface of the half cylindrical part 62A and the inner peripheral surface of the small-diameter hole part 34B. The flange part 62B has a first sun gear abutting surface 62B1 with which the end surface 28A of the first sun gear 28 is brought into contact and a second sun gear abutting surface 62B2 located on a surface opposite to the first sun gear abutting surface 62B1 and with which the stepped part 34A of the second sun gear 33 is brought into contact.

Here, a combining surface 62E having an L-shape brought into contact with the second half bush 63 when being combined with the second half bush 63 is formed between the inner peripheral surface 62C and an outer peripheral surface 62D of the first half bush 62. The combining surface 62E is formed by a half cylindrical part abutting part 62E1 brought into contact with the half cylindrical part 63A of the second half bush 63 and a flange part abutting part 62E2 brought into contact with the flange part 63B of the second half bush 63. A chamfered part 62F is formed at a corner part where the flange part abutting part 62E2 crosses the first sun gear abutting surface 62B1 by cutting away the corner part.

The second half bush 63 is also constituted by a half cylindrical part 63A and a flange part 63B similarly to the first half bush 62. The gap S2 in the radial direction is provided between an inner peripheral surface 63C of the second half bush 63 and the small-diameter shaft 27B of the rotational shaft 25, and a slight gap is provided between the outer peripheral surface of the half cylindrical part 63A and the inner peripheral surface of the small-diameter hole part 34B. The flange part 63B has a first sun gear abutting surface 63B1 with which the end surface 28A of the first sun gear 28 is brought into contact and a second sun gear abutting surface 63B2 with which the stepped part 34A of the second sun gear 33 is brought into contact.

Here, a combining surface 63E having an L-shape is formed between the inner peripheral surface 63C of the second half bush 63 and an outer peripheral surface 63D. The combining surface 63E is formed by a half cylindrical part abutting part 63E1 brought into contact with the half cylindrical part 63A of the second half bush 63 and a flange part abutting part 63E2 brought into contact with the flange part 63B of the second half bush 63. A chamfered part 63F is formed at a corner part where the flange part abutting part 63E2 crosses the first sun gear abutting surface 63B1 by cutting away the corner part.

The reduction device according to the third embodiment has the sliding member 61 as described above, and its basic operation does not have a particular difference from that according to the first embodiment.

Here, in the case where the first half bush 62 and the second half bush 63 are departed from each other in the axial direction, a step in the axial direction is generated on a combined portion of the flange parts 62B and 63B of the first and second half bushes 62 and 63. In this case, there is a concern that the edge of each tooth of the first sun gear 28 is caught by the step generated on the combined portion of the flange parts 62B and 63B.

In response to that, the third embodiment is constituted such that, the chamfered part 62F is provided at the corner part where the combining surface 62E of the first half bush 62 and the first sun gear abutting surface 62B1 cross each other, and the chamfered part 63F is provided at the corner part where the combining surface 63E of the second half bush 63 and the first sun gear abutting surface 63B1 cross each other.

As a result, even in the case where the first and second half bushes 62 and 63 are departed from each other in the axial direction, and a step is generated between the flange parts 62B and 63B, the edge of each tooth of the first sun gear 28 is smoothly brought into contact with the chamfered parts 62F and 63F of the first and second half bushes 62 and 63. Thereby, the edge of each tooth of the first sun gear 28 is prevented from being caught by the step between the flange parts 62B and 63B. As a result, the lives of the first and second half bushes 62 and 63 can be improved, and the rotational shaft 25 (first sun gear 28) can be stably rotated.

Next, FIG. 16 to FIG. 23 show a fourth embodiment of the present invention. A characteristic of the fourth embodiment is that the axial length dimension of the small-diameter shaft of the rotational shaft is made larger than a total length dimension of the axial length dimension of the first planetary gear and the axial length dimension of the sliding member. It should be noted that in the fourth embodiment, the same reference numerals are given to the same constituent elements in the aforementioned first embodiment, and the explanation will be omitted.

A rotational shaft 71 used in the fourth embodiment is arranged by extending in the axial direction in the rotating-side housing 21. The rotational shaft 71 is constituted by a male spline part 72 provided on one side in the axial direction, a shaft part 73 extending in the axial direction from the male spline part 72, and a first sun gear 28 provided on the other side in the axial direction similarly to the rotational shaft 25 according to the first embodiment. The male spline part 72 is spline-connected with the female spline part 16A of the output shaft 16.

The shaft part 73 of the rotational shaft 71 has the male spline part 72 side formed as a large-diameter shaft 73A and the first sun gear 28 side as a stepped shaft which is a small-diameter shaft 73B with a diameter smaller than that of the large-diameter shaft 73A. An addendum outer diameter dimension of the male spline part 72 and an outer diameter dimension of the large-diameter shaft 73A have values smaller than the hole diameter of the through hole 34 of the second sun gear 33.

Figure 17:
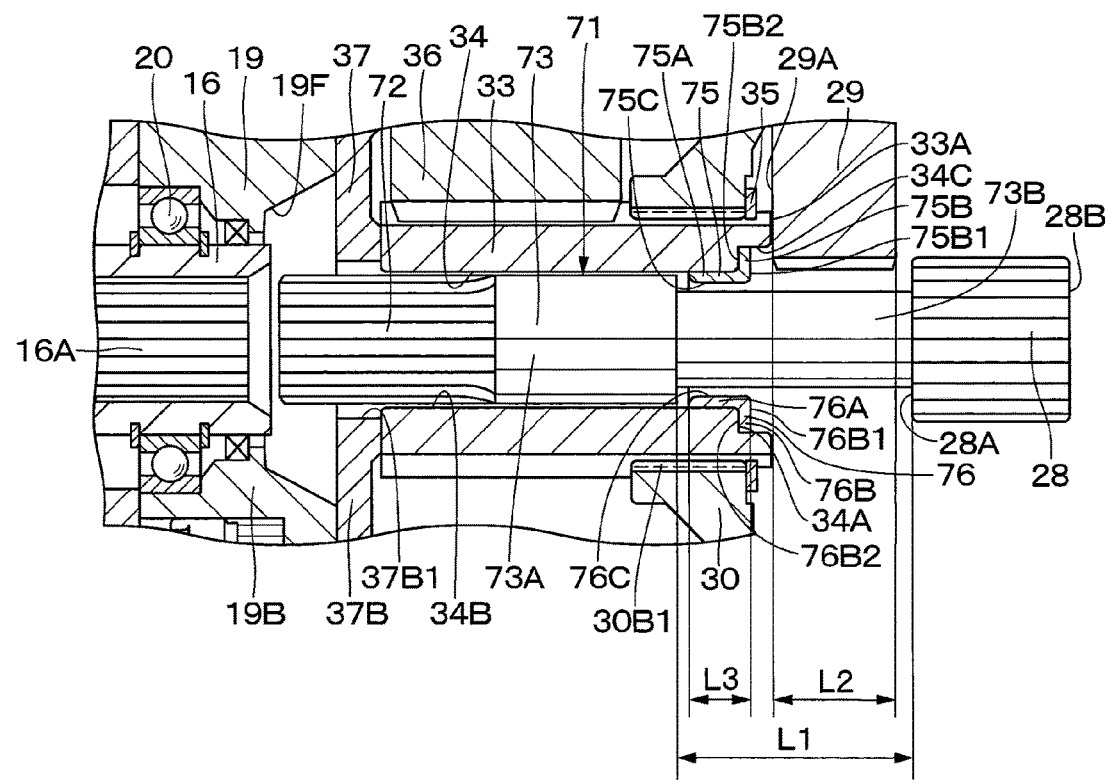
FIG. 17 is an enlarged sectional view of an essential part showing a state where meshing between the first sun gear and the first planetary gear in FIG. 16 is released.
Figure 18:
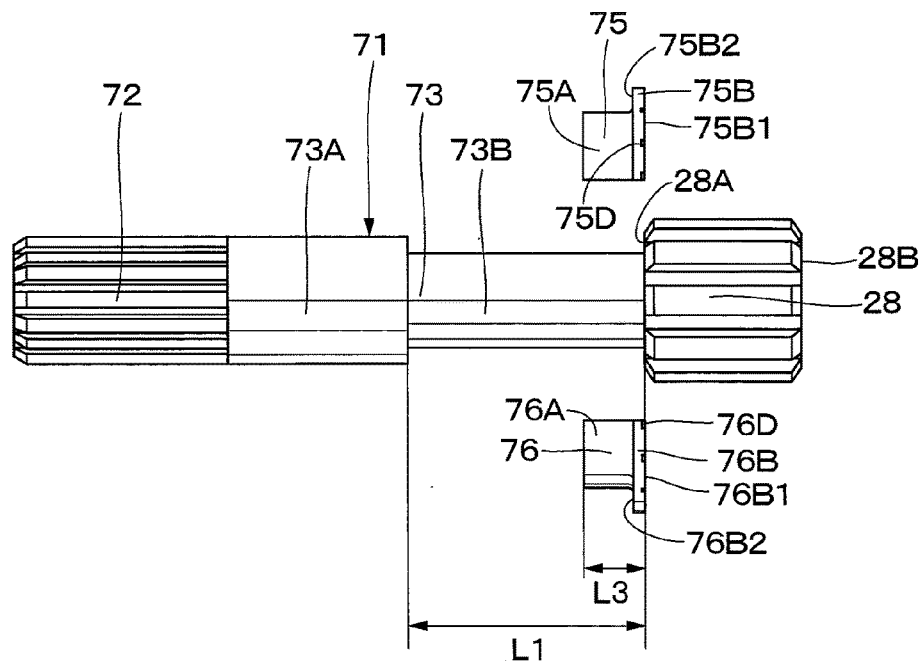
FIG. 18 is a front view showing a state where the sliding member is removed from the rotational shaft.
Figure 19:
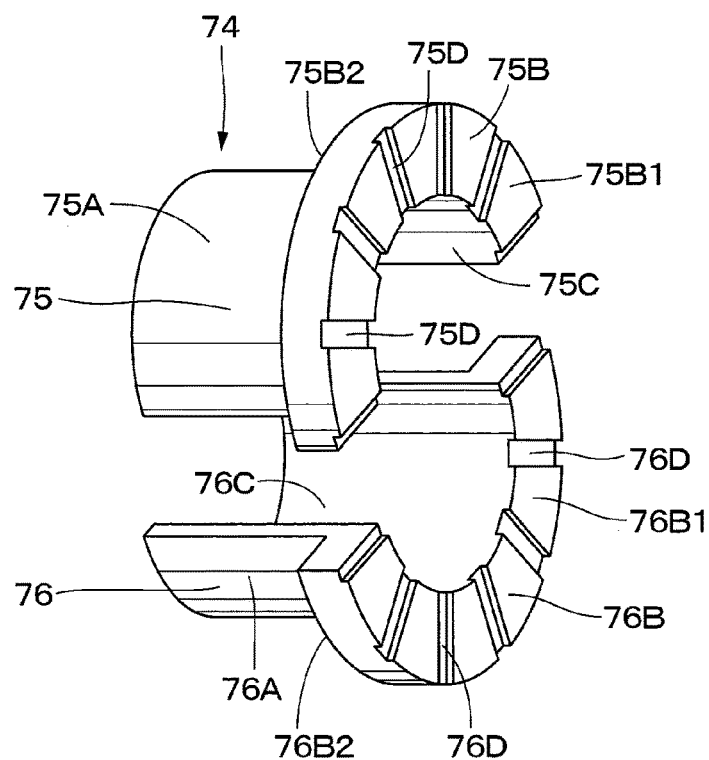
FIG. 19 is a perspective view showing the sliding member (first half bush, a second half bush) as a single body.
Figure 22:
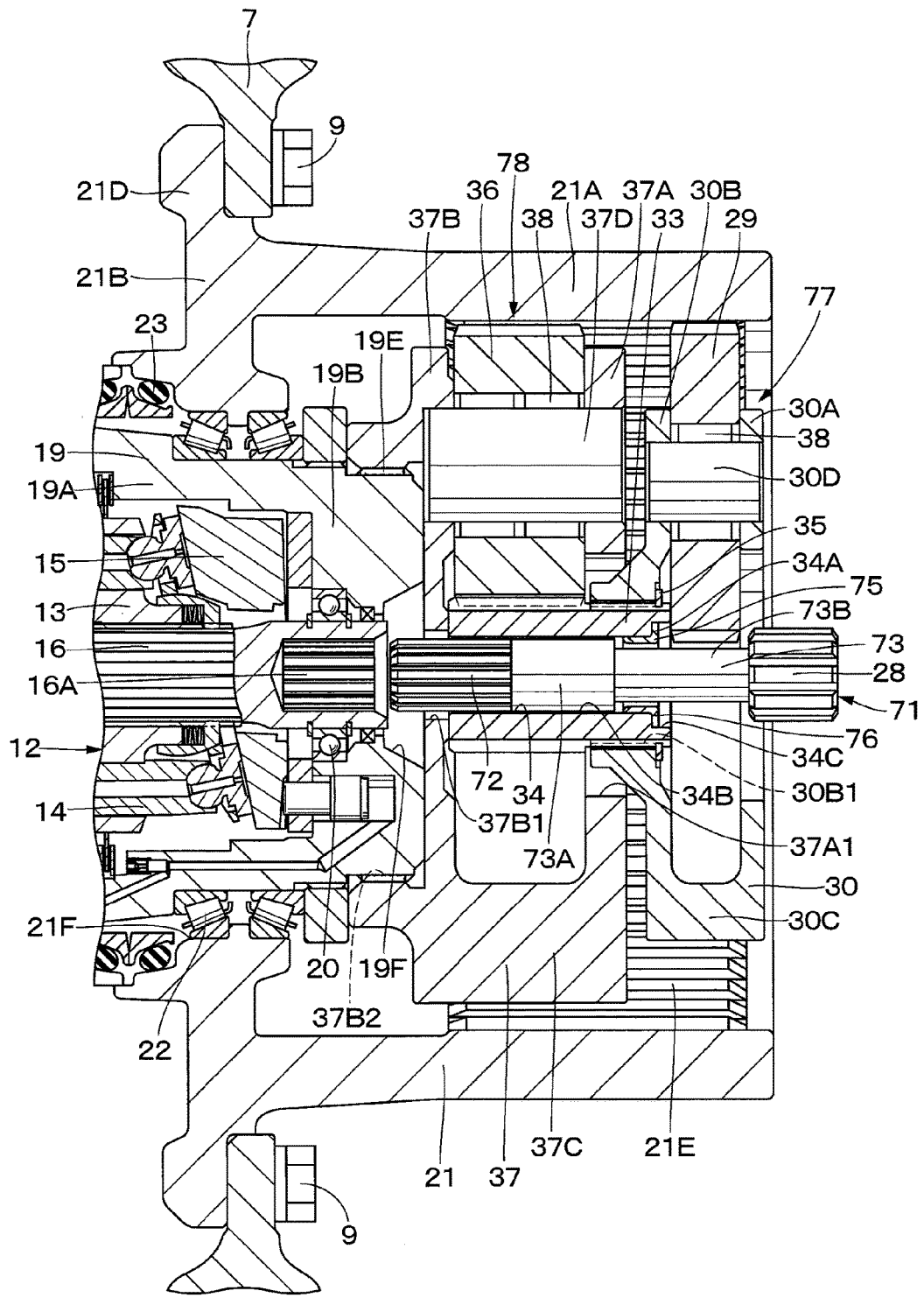
FIG. 22 is a sectional view showing a state where the second sun gear is meshed with the second planetary gear assembled in the rotating-side housing, and the first planetary gear is meshed with an internal gear.

Here, as shown in FIG. 17, an axial length dimension L1 of the small-diameter shaft 73B of the rotational shaft 71 has a value (L1>L2+L3) larger than the total length dimension of the axial length dimension L2 of the first planetary gear 29 and the axial length dimension L3 of the sliding member 74 which will be described later. Therefore, as shown in FIG. 22, it is constituted such that, when the first-stage planetary gear reduction mechanism 24 and the second-stage planetary gear reduction mechanism 32 are assembled in the rotating-side housing 21, meshing between the first sun gear 28 and the first planetary gear 29 can be released.

Figure 16:
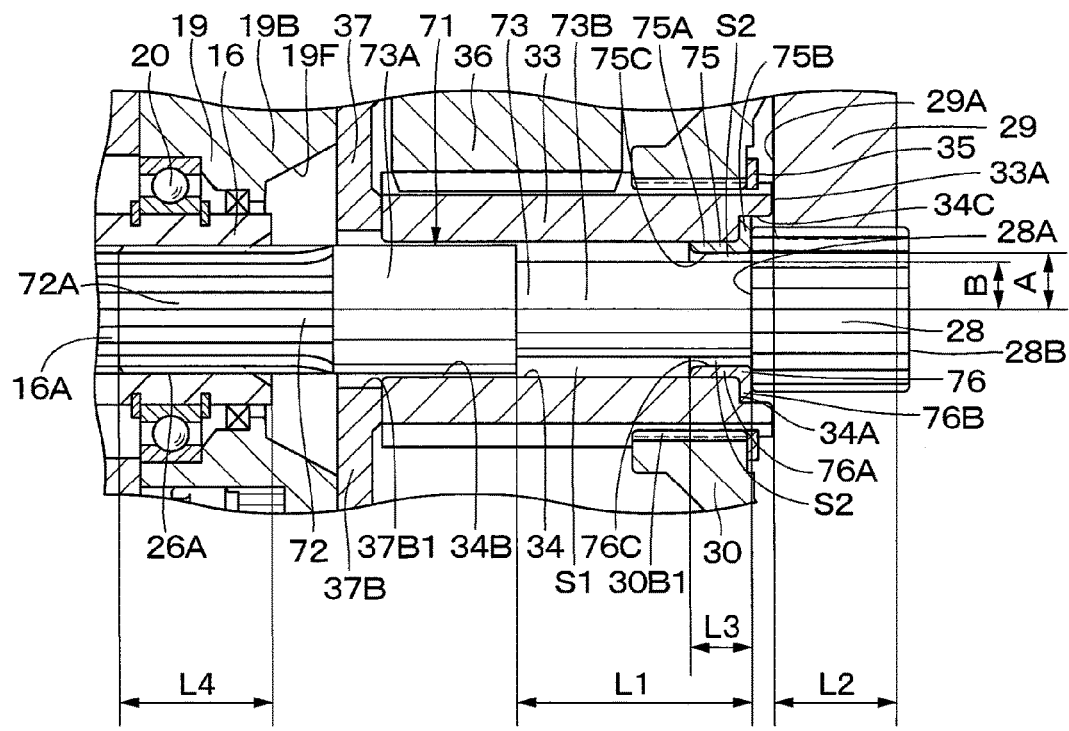

Further, as shown in FIG. 16, the axial length dimension L1 of the small-diameter shaft 73B of the rotational shaft 71 has a value (L1>L3+L4) larger than a total length dimension of an axial length dimension L3 of the sliding member 74 and an axial length dimension L4 of a spline connecting part 72A between the female spline part 16A of the output shaft 16 and the male spline part 72 of the rotational shaft 71. Thereby, as shown in FIG. 22, it is constituted such that, when the first-stage planetary gear reduction mechanism 24 and the second-stage planetary gear reduction mechanism 32 are assembled in the rotating-side housing 21, meshing between the first sun gear 28 and the first planetary gear 29 can be released, and meshing between the female spline part 16A of the output shaft 16 and the male spline part 72 of the rotational shaft 71 can be released.

The sliding member 74 is constituted by a first half bush 75 and a second half bush 76 having the same shape similarly to the sliding member 51 used in the second embodiment. This sliding member 74 is fitted with an outer peripheral side of the small-diameter shaft 73B of the rotational shaft 71 and is brought into slidable contact with the first sun gear 28 and the second sun gear 33.

The first half bush 75 is constituted by a half cylindrical part 75A extending in the axial direction in the small-diameter hole part 34B of the through hole 34 in the second sun gear 33 and a flange part 75B extending outward in the radial direction from the position of the stepped part 34A of the through hole 34. As shown in FIG. 16, a radial dimension A on an inner diameter side of the half cylindrical part 75A is formed having a value larger than a radial dimension B of the small-diameter shaft 73B of the rotational shaft 71. Accordingly, the gap S2 in the radial direction is provided between the small-diameter shaft 73B of the rotational shaft 71 and an inner peripheral surface 75C of the first half bush 75.

The flange part 75B of the first half bush 75 has a first sun gear abutting surface 75B1 with which the end surface 28A of the first sun gear 28 is brought into contact and a second sun gear abutting surface 75B2 with which the stepped part 34A of the second sun gear 33 is brought into contact. Here, an axial dimension between the axial end portion of the half cylindrical part 75A and the first sun gear abutting surface 75B1 is the axial length dimension L3 of the first half bush 75 (sliding member 74). A plurality of concave parts 75D recessed toward the second sun gear abutting surface 75B2 is provided in the first sun gear abutting surface 75B1 at intervals in the circumferential direction (see FIG. 19). That is, it is constituted such that the first sun gear abutting surface 75B1 is formed as a projection and recess surface by each of the concave parts 75D, and contact friction (friction resistance) between the first sun gear abutting surface 75B1 and the end surface 28A of the first sun gear 28 is increased.

The second half bush 76 is also constituted by a half cylindrical part 76A and a flange part 76B similarly to the first half bush 75, and the flange part 76B has a first sun gear abutting surface 76B1 and a second sun gear abutting surface 76B2. The first sun gear abutting surface 76B1 is formed as a projection and recess surface by providing a plurality of concave parts 76D recessed toward the second sun gear abutting surface 76B2.

The reduction device according to the fourth embodiment has the rotational shaft 71 as described above, and its basic operation does not have a particular difference from that according to the first embodiment. However, the fourth embodiment is constituted such that, by using the rotational shaft 71, workability when the first-stage and second-stage planetary gear reduction mechanisms 24 and 32 are assembled in the rotating-side housing 21 can be improved. Thus, an assembling procedure of assembling the first-stage and second-stage planetary gear reduction mechanisms 24 and 32 in the rotating-side housing 21 will be explained.

Figure 20:
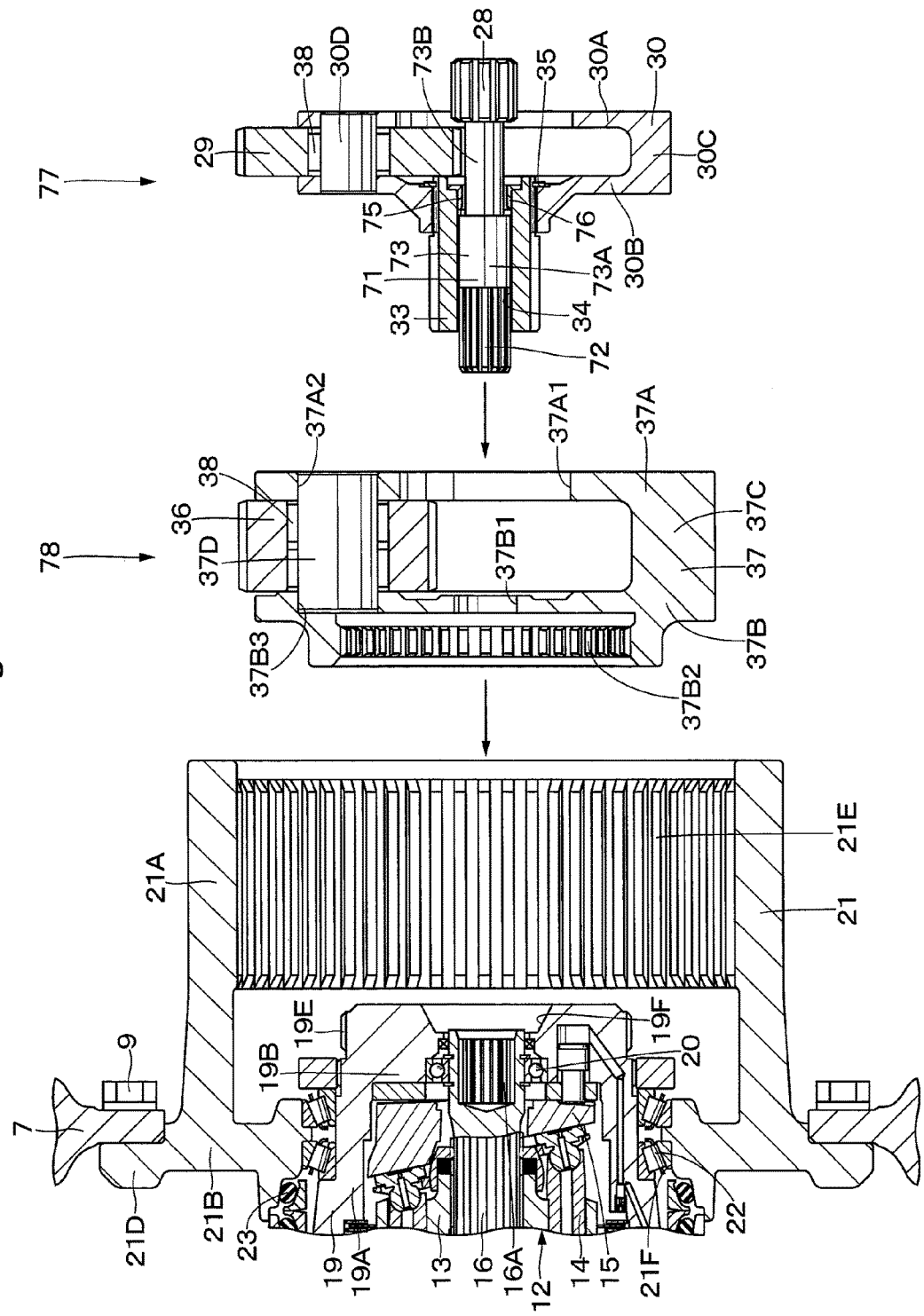
FIG. 20 is an exploded view showing that the first-stage and second-stage planetary gear reduction mechanisms are removed from the rotating-side housing.

As shown in FIG. 20, the first-stage and second-stage planetary gear reduction mechanisms 24 and 32 are assembled separately as a first assembly 77 and a second assembly 78. These first assembly 77 and second assembly 78 are assembled in the rotating-side housing 21 from which the lid part 21C is removed.

The first assembly 77 is constituted by including the rotational shaft 71, the first and second half bushes 75 and 76, the first planetary gear 29, the first carrier 30, and the second sun gear 33 and is assembled by the procedure similar to that of the first assembly 42 according to the first embodiment. The second assembly 78 is constituted by including the second planetary gear 36 and the second carrier 37 and is assembled by the procedure similar to that of the second assembly 43 according to the first embodiment.

In the case where the second assembly 78 is to be assembled in the rotating-side housing 21, in a state where each of the second planetary gears 36 is meshed with the internal gear 21E of the rotating-side housing 21, respectively, the second carrier 37 is inserted into the cylinder part 21A of the rotating-side housing 21. Then, the female spline part 37B2 of the second carrier 37 is spline-connected with the male spline part 19E of the fixed-side housing 19, and the second carrier 37 is brought into contact with the bottom part 19B of the fixed-side housing 19.

Figure 21:
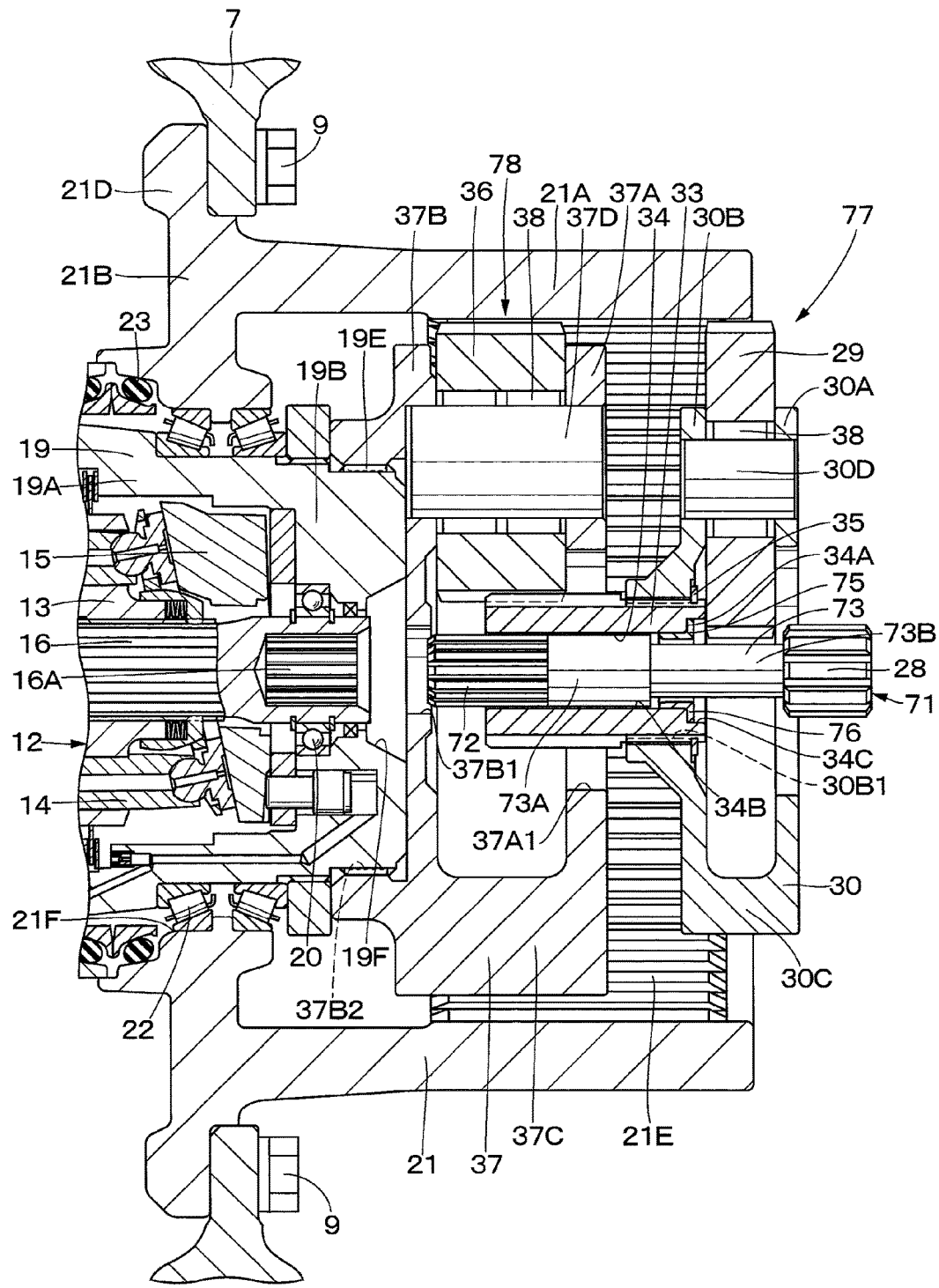
FIG. 21 is a sectional view showing a state where the first-stage and second-stage planetary gear reduction mechanisms are assembled in the rotating-side housing.

Subsequently, as shown in FIG. 21, the first assembly 77 is assembled in the rotating-side housing 21. In this case, the rotational shaft 71 inserted into the through hole 34 of the second sun gear 33 is made to slide (move) in a direction away from the fixed-side housing 19. Here, the first and second half bushes 75 and 76 (sliding member 74) are fitted movably in the axial direction with respect to the small-diameter shaft 73B of the rotational shaft 71. Moreover, the axial length dimension L1 of the small-diameter shaft 73B of the rotational shaft 71 is set to a value (L1>L2+L3) larger than the total length dimension of the axial length dimension L2 of the first planetary gear 29 and the axial length dimension L3 of the sliding member 74.

Thus, in a state where the shaft end portion of the large-diameter shaft 73A of the rotational shaft 71 is brought into contact with the first and second half bushes 75 and 76 or has been moved to the vicinity thereof, the first sun gear 28 of the rotational shaft 71 can be released from meshing with each of the first planetary gears 29.

Then, in a state where the first sun gear 28 is released from meshing with each of the first planetary gears 29, the second sun gear 33 is inserted into the sun gear through hole 37A1 of the second carrier 37. At this time, the second sun gear 33 is meshed with the plurality of second planetary gears 36 supported by the second carrier 37 and each of the first planetary gears 29 supported by the first carrier 30 is meshed with the internal gear 21E of the rotating-side housing 21. In this case, since each of the first planetary gears 29 is not meshed with the first sun gear 28, each can rotate freely. Accordingly, the second sun gear 33 can be meshed with each of the second planetary gears 36 while each of the first planetary gears 29 is easily meshed with the internal gear 21E.

As described above, as shown in FIG. 22, the first carrier 30, each of the first planetary gears 29, and the second sun gear 33 constituting the first assembly 77 are accommodated in the cylinder part 21A of the rotating-side housing 21. Here, the axial length dimension L1 of the small-diameter shaft 73B of the rotational shaft 71 is set to a value (L1>L3+L4) larger than the total length dimension of the axial length dimension L3 of the sliding member 74 and the axial length dimension L4 of the spline connecting part 72A between the female spline part 16A of the output shaft 16 and the male spline part 72 of the rotational shaft 71.

Thus, in the state where the shaft end portion of the large-diameter shaft 73A of the rotational shaft 71 is brought into contact with the first and second half bushes 75 and 76 or has been moved to the vicinity thereof, the male spline part 72 of the rotational shaft 71 can be released from meshing with the female spline part 16A of the output shaft 16. As described above, when the first assembly 77 is accommodated in the cylinder part 21A of the rotating-side housing 21, the male spline part 72 of the rotational shaft 71 can be released from meshing with the female spline part 16A of the output shaft 16 and the first sun gear 28 of the rotational shaft 71 can be released from meshing with each of the first planetary gears 29. Accordingly, the rotational shaft 71 can freely rotate in the through hole 34 of the second sun gear 33.

Figure 23:
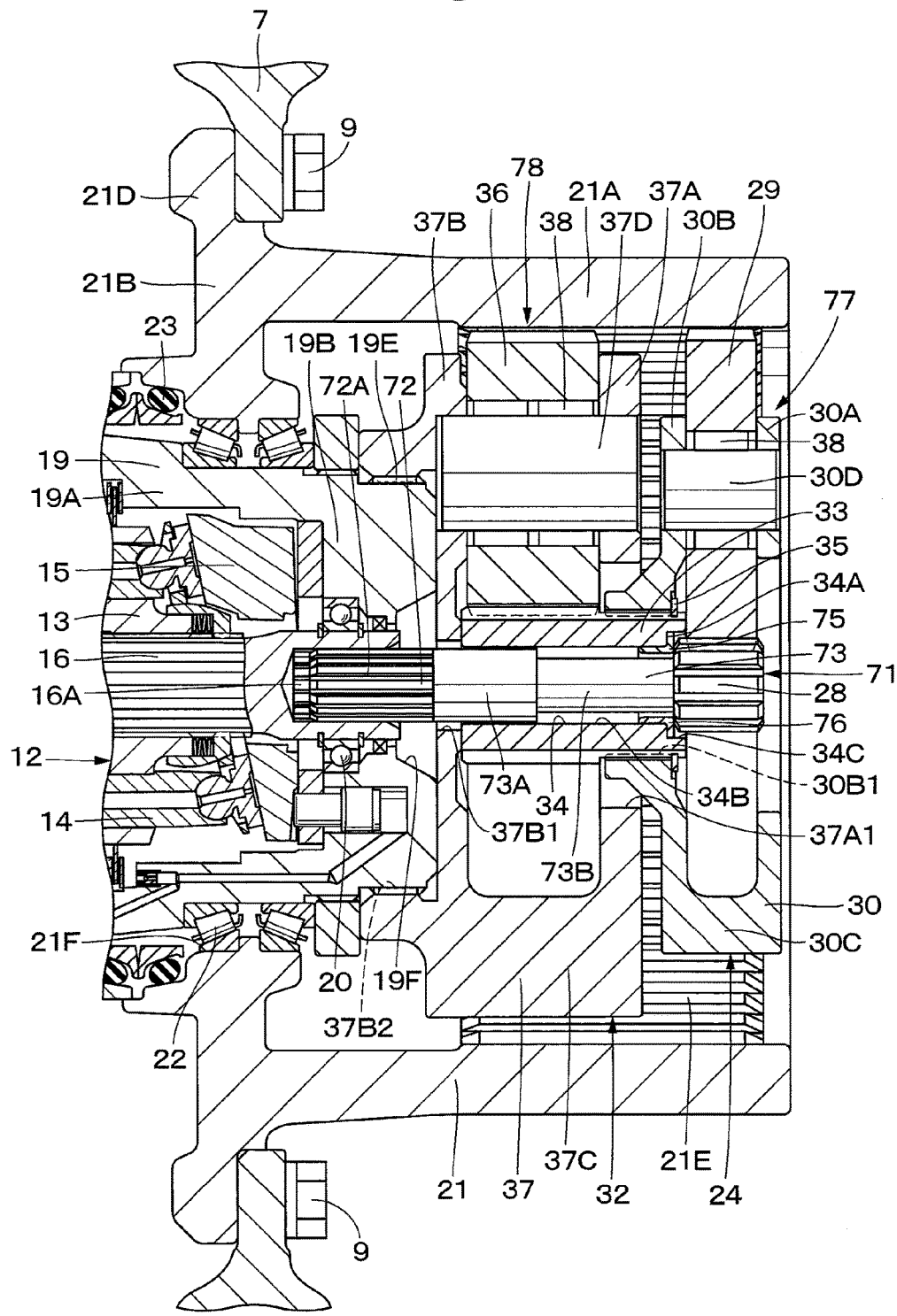
FIG. 23 is a sectional view showing a state where the first sun gear is meshed with the first planetary gear, and a male spline part of the rotational shaft is meshed with a female spline part of the output shaft.

Subsequently, as shown in FIG. 23, the rotational shaft 71 is moved toward the fixed-side housing 19. Thereby, the male spline part 72 of the rotational shaft 71 is spline-connected with the female spline part 16A of the output shaft 16, and the first sun gear 28 is meshed with each of the first planetary gears 29, respectively. In this case, by rotating only the rotational shaft 71 in the through hole 34 of the second sun gear 33, phases of each tooth of the male spline part 72 of the rotational shaft 71 and each tooth of the female spline part 16A of the output shaft 16 can be easily matched with each other. Moreover, phases of each tooth of the first sun gear 28 of the rotational shaft 71 and each tooth of each of the first planetary gears 29 can be easily matched. As a result, a work of spline-connecting the male spline part 72 of the rotational shaft 71 with the female spline part 16A of the output shaft 16 and a work of meshing the first sun gear 28 with each of the first planetary gears 29 can be performed rapidly.

As described above, the second assembly 78 and the first assembly 77 are assembled in the cylinder part 21A of the rotating-side housing 21, and the male spline part 72 of the rotational shaft 71 is spline-connected with the female spline part 16A of the output shaft 16. On the other hand, in a state where the first sun gear 28 is meshed with each of the first planetary gears 29, the lid part 21C is mounted on the cylinder part 21A. Thereby, the first-stage and second-stage planetary gear reduction mechanisms 24 and 32 are assembled in the cylinder part 21A of the rotating-side housing 21.

Then, in the fourth embodiment, the axial length dimension L1 of the small-diameter shaft 73B of the rotational shaft 71 is set to a value (L1>L2+L3) larger than the total length dimension of the axial length dimension L2 of the first planetary gear 29 and the axial length dimension L3 of the sliding member 74. As a result, when the first assembly 77 is assembled in the cylinder part 21A of the rotating-side housing 21, the rotational shaft 71 is moved in the through hole 34 of the second sun gear 33 so that the first sun gear 28 can be released from meshing with each of the first planetary gears 29. As a result, in a state where each of the first planetary gears 29 can be freely rotated, after the second sun gear 33 is meshed with each of the second planetary gears 36, each of the first planetary gears 29 can be meshed with the internal gear 21E, respectively.

Further, the axial length dimension L1 of the small-diameter shaft 73B of the rotational shaft 71 is set to a value (L1>L3+L4) larger than the total length dimension of the axial length dimension L3 of the sliding member 74 and the axial length dimension L4 of the spline connecting part 72A between the female spline part 16A of the output shaft 16 and the male spline part 72 of the rotational shaft 71. Thereby, when the first assembly 77 is assembled in the cylinder part 21A of the rotating-side housing 21, the male spline part 72 of the rotational shaft 71 can be released from meshing with the female spline part 16A of the output shaft 16, and the first sun gear 28 of the rotational shaft 71 can be released from meshing with each of the first planetary gears 29. As a result, by rotating only the rotational shaft 71 in the through hole 34 of the second sun gear 33, the male spline part 72 of the rotational shaft 71 can be easily spline-connected with the female spline part 16A of the output shaft 16. Furthermore, the first sun gear 28 of the rotational shaft 71 can be easily meshed with each of the first planetary gears 29. As a result, workability when the first-stage and second-stage planetary gear reduction mechanisms 24 and 32 are assembled to the rotating-side housing 21 can be improved.

It should be noted that in the aforementioned first embodiment, the case where the first and second half bushes 40 and 41 constituting the sliding member 39 are formed each having an L-shaped section by the half cylindrical parts 40A and 41A and the flange parts 40B and 41B is exemplified.

Figure 24:
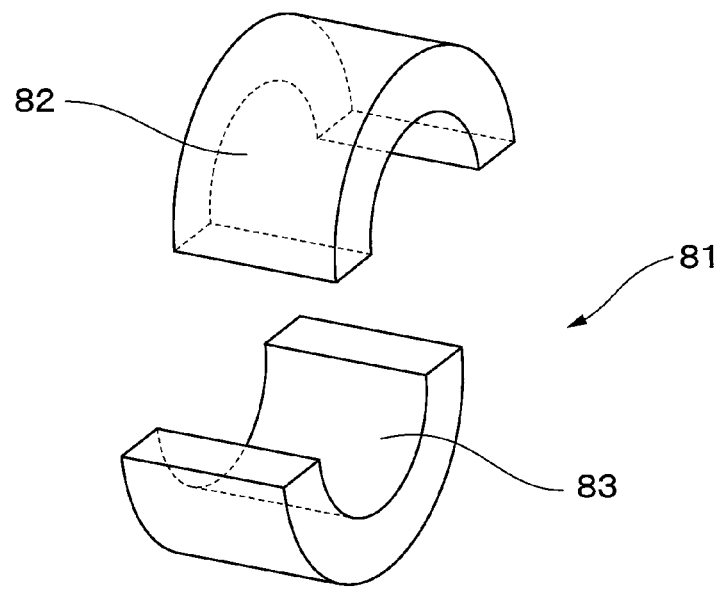
FIG. 24 is a perspective view showing the sliding member according to a modification (first half bush, a second half bush) as a single body.
Figure 25:
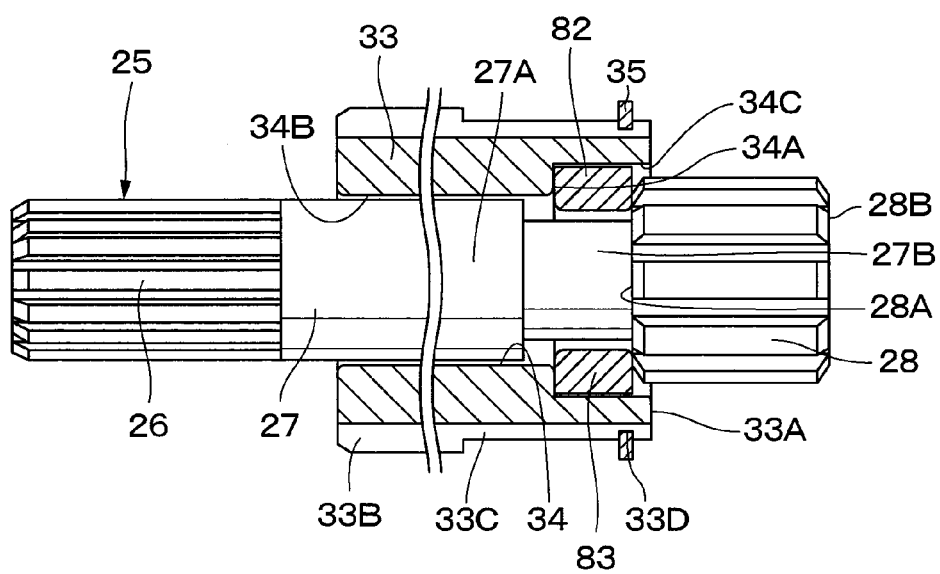
FIG. 25 is a sectional view similar to FIG. 5 showing a state where the rotational shaft on which the sliding member according to the modification is mounted is inserted into the through hole of the second sun gear.

However, the present invention is not limited thereto, but a sliding member 81 as in a variation shown in FIG. 24 and FIG. 25, for example, may be formed.

That is, the sliding member 81 may be constituted by a first half bush 82 having a semi-cylindrical shape without a flange part and a second half bush 83 having the same shape as that of the first half bush 82. In this case, the first and second half bushes 82 and 83 can be fitted in a gap of the large-diameter hole part 34C of the second sun gear 33 in a state fitted with the small-diameter shaft 27B of the rotational shaft 25 from an outer side in the radial direction.

In the first embodiment, the case where the first half bush 40 and the second half bush 41 are formed having the same shape is exemplified. However, the present invention is not limited thereto, but the axial length dimensions of the half cylindrical parts 40A and 41A of the first and second half bushes 40 and 41 may be different, for example, and the both do not necessarily have to have the same shape. Moreover, split surfaces of the first and second half bushes 40 and 41 do not necessarily have to be flat surfaces.

In the second embodiment, the case where the concave parts 52D and 53D are formed in the first sun gear abutting surfaces 52B1 and 53B1 of the first and second half bushes 52 and 53 is exemplified. However, the present invention is not limited thereto, but a projecting part fitted in a tooth groove portion of the end surface of the first sun gear may be provided on the first sun gear abutting surface, for example. Moreover, a sheet which coarsens surface roughness may be bonded to the first sun gear abutting surface, or the surface may be subjected to treatment.

Further, in each of the embodiments, the case where the reduction device 18 is used in the traveling device 11 of a hydraulic excavator 1 is explained as an example. However, the present invention is not limited thereto, but it can be widely applied to traveling devices of other construction machines such as a hydraulic crane and the like, for example, and winch device for taking up ropes and the like.

DESCRIPTION OF REFERENCE NUMERALS

11: Traveling device
12: Hydraulic motor (Rotating source)
16: Output shaft
16A: Female spline part
18: Reduction device
19: Fixed-side housing
21: Rotating-side housing
21E: Internal gear
24: First-stage planetary gear reduction mechanism
25, 71: Rotational shaft
26, 72: Male spline part
27, 73: Shaft part
27A, 73A: Large-diameter shaft
27B, 73B: Small-diameter shaft
28: First sun gear
28A: End surface
29: First planetary gear
29A: End surface
30: First carrier
32: Second-stage planetary gear reduction mechanism
33: Second sun gear
33A: End surface
33B: Gear meshing part
33C: Carrier connecting part
34: Through hole
34A: Stepped part
34B: Small-diameter hole part
34C: Large-diameter hole part
34D: Gap
35: Stop ring (Positioning member)
36: Second planetary gear
37: Second carrier
39, 51, 61, 74, 81: Sliding member
40, 52, 62, 75, 82: First half bush
40A, 41A, 52A, 53A, 62A, 63A, 75A, 76A: Half cylindrical part
40B, 41B, 52B, 53B, 62B, 63B, 75B, 76B: Flange part
40B1, 41B1, 52B1, 53B1, 62B1, 63B1, 75B1, 76B1: First sun gear abutting surface
40B2, 41B2, 52B2, 53B2, 62B2, 63B2, 75B2, 76B2: Second sun gear abutting surface
40C, 41C, 52C, 53C, 62C, 63C, 75C, 76C: Inner peripheral surface
40D, 41D: Recessed part
52D, 53D, 75D, 76D: Concave part
41, 53, 63, 76, 83: Second half bush
62E, 63E: Combining surface
62F, 63F: Chamfered part
72A: Spline connecting part

The invention claimed is:

1. A reduction device comprising:
a fixed-side housing accommodating a rotating source having an output shaft in which a female spline part is provided;
a rotating-side housing rotatably provided with respect to said fixed-side housing and driven by said rotating source;
a first-stage planetary gear reduction mechanism which is accommodated in said rotating-side housing and reduces a speed of rotation of said rotating source;
a second-stage planetary gear reduction mechanism located in said rotating-side housing and disposed between said rotating source and said first-stage planetary gear reduction mechanism and reduces the speed of rotation of said first-stage planetary gear reduction mechanism and rotates said rotating-side housing, wherein
said first-stage planetary gear reduction mechanism comprises:
a rotational shaft arranged by extending in an axial direction in said rotating-side housing and having one side in the axial direction on which a male spline part which is spline-connected with said female spline part of said output shaft is provided,
a first sun gear provided on the other side in the axial direction of said rotational shaft,
a plurality of first planetary gears meshed with said first sun gear and an internal gear provided on an inner peripheral side of said rotating-side housing and revolving while rotating around said first sun gear, and
a first carrier rotatably supporting each of said first planetary gears; and
said second-stage planetary gear reduction mechanism comprises:
a second sun gear formed of a cylindrical body having a through hole through which said rotational shaft is inserted and arranged between said female spline part of said output shaft and said first sun gear and connected to said first carrier,
a plurality of second planetary gears meshed with said second sun gear and said internal gear provided on the inner peripheral side of said rotating-side housing and rotating around said second sun gear so as to rotate said rotating-side housing, and
a second carrier mounted on said fixed-side housing in a non-rotation state and rotatably supporting each of said second planetary gears, characterized in that:
said rotational shaft of said first-stage planetary gear reduction mechanism is formed as a stepped shaft having said male spline part side as a large-diameter shaft and said first sun gear side as a small-diameter shaft between said male spline part on one side in the axial direction and said first sun gear on the other side in the axial direction; and
a sliding member made of two half bodies and fitted with an outer peripheral side of said small-diameter shaft of said rotational shaft is provided between said first sun gear and said second sun gear, and said sliding member is in slidable contact with said first sun gear and said second sun gear.

2. The reduction device according to claim 1, wherein a gear meshing part with which said second planetary gear is meshed, a carrier connecting part arranged adjacent to said gear meshing part in the axial direction and with which said first carrier is connected, and a positioning member for positioning said first carrier connected to said carrier connecting part between said positioning member and said gear meshing part in the axial direction are provided on the outer peripheral side of said second sun gear.

3. The reduction device according to claim 1, wherein
said sliding member is constituted by a first half bush and a second half bush combined having a cylindrical shape by sandwiching said small-diameter shaft of said rotational shaft and inserted into said through hole of said second sun gear;
a radial dimension on an inner diameter side of said first half bush and a radial dimension on an inner diameter side of said second half bush are formed to a value larger than a radial dimension of said small-diameter shaft; and
a gap in a radial direction is provided between said small-diameter shaft of said rotational shaft and an inner peripheral surface of said first and second half bushes.

4. The reduction device according to claim 3, wherein
a stepped part is provided in said through hole of said second sun gear at a position close to said first sun gear, said male spline part side from said stepped part is formed as a small-diameter hole part over the whole length, and said first sun gear side is formed as a large-diameter hole part having a large diameter; and
said first and second half bushes is constituted by a half cylindrical part extending in said axial direction in said small-diameter hole part of said through hole and a flange part extending outward in a radial direction from a position of said stepped part and brought into contact with said stepped part of said second sun gear and an end surface of said first sun gear.

5. The reduction device according to claim 4, wherein said flange part of said first and second half bushes has a first sun gear abutting surface with which said first sun gear is brought into contact and a second sun gear abutting surface located on a surface opposite to said first sun gear abutting surface and with which said stepped part of said second sun gear is brought into contact;
a plurality of recessed parts allowing said second sun gear abutting surface to communicate with an outer peripheral surface of said flange part is respectively provided in said flange part of said first and second half bushes; and
a gap is provided between an inner peripheral surface of said large-diameter hole part formed on said second sun gear and said outer peripheral surface of each of said flange parts.

6. The reduction device according to claim 4, wherein
a flange part of said first and second half bushes has a first sun gear abutting surface with which said first sun gear is brought into contact and a second sun gear abutting surface located on a surface opposite to said first sun gear abutting surface and with which said stepped part of said second sun gear is brought into contact; and
said first sun gear abutting surface is formed as a projection and recess surface which increases contact friction with said first sun gear.

7. The reduction device according to claim 4, wherein
a flange part of said first and second half bushes has a first sun gear abutting surface with which said first sun gear is brought into contact and a second sun gear abutting surface located on a surface opposite to said first sun gear abutting surface and with which said stepped part of said second sun gear is brought into contact; and
a chamfered part is provided at a corner part where a combining surface with which each of said half bushes is brought into contact when said first and second half bushes are combined crosses said first sun gear abutting surface by cutting away the corner part.

8. The reduction device according to claim 1, wherein
an axial length dimension (L1) of said small-diameter shaft of said rotational shaft is formed having a value (L1>L2+L3) larger than a total length dimension of an axial length dimension (L2) of said first planetary gear and a an axial length dimension (L3) of said sliding member.

9. The reduction device according to claim 8, wherein
the axial length dimension (L1) of said small-diameter shaft of said rotational shaft is formed having a value (L1>L3+L4) larger than a total length dimension of the axial length dimension (L3) of said sliding member and an axial length dimension (L4) of a spline connecting part where said female spline part of said output shaft and said male spline part of said rotational shaft are meshed with each other.

* * * * *